(12) United States Patent
Jeong et al.

(10) Patent No.: US 11,579,462 B2
(45) Date of Patent: Feb. 14, 2023

(54) REFLECTING MODULE FOR OIS AND CAMERA MODULE INCLUDING THE SAME

(71) Applicant: Samsung Electro-Mechanics Co., Ltd., Suwon-si (KR)

(72) Inventors: Bong Won Jeong, Suwon-si (KR); Jae Kyung Kim, Suwon-si (KR); Young Bok Yoon, Suwon-si (KR); Hyun Kag Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 64 days.

(21) Appl. No.: 17/108,398

(22) Filed: Dec. 1, 2020

(65) Prior Publication Data

US 2021/0080744 A1    Mar. 18, 2021

Related U.S. Application Data

(63) Continuation of application No. 16/535,132, filed on Aug. 8, 2019, now Pat. No. 10,877,289, which is a
(Continued)

(30) Foreign Application Priority Data

Feb. 15, 2017    (KR) .................. 10-2017-0020555

(51) Int. Cl.
*G02B 27/64*    (2006.01)
*G03B 5/00*    (2021.01)
(Continued)

(52) U.S. Cl.
CPC ....... *G02B 27/646* (2013.01); *G02B 13/0065* (2013.01); *G02B 27/64* (2013.01);
(Continued)

(58) Field of Classification Search
None
See application file for complete search history.

(56) References Cited

U.S. PATENT DOCUMENTS 5,637,861 A  *  6/1997  Okada .................. H04N 3/1587
                                                        359/557
6,086,209 A      7/2000  Miyahara et al.
(Continued)

FOREIGN PATENT DOCUMENTS

CN    101414094 A    4/2009
CN    101762939 A    6/2010
(Continued)

OTHER PUBLICATIONS

Chinese Office Action dated Jan. 17, 2022, in counterpart Chinese Patent Application No. 202011307022.4 (15 pages in English and 10 pages in Chinese).
(Continued)

*Primary Examiner* — Derek S. Chapel
(74) *Attorney, Agent, or Firm* — NSIP Law

(57) ABSTRACT

There are provided a reflecting module for optical image stabilization (OIS) and a camera module including the same. The reflecting module for OIS includes a housing to which a board is coupled, the housing including an opening, a moving holder disposed in an internal space of the housing, an elastic member fixedly coupled to the housing to support the moving holder so that the moving holder is movable, a reflecting member provided on the movable holder, and a driving part including a plurality of magnets provided on the moving holder, and a plurality of coils provided on the board and respectively opposing the plurality of magnets, wherein the plurality of coils are disposed to oppose the plurality of magnets through the opening.

17 Claims, 19 Drawing Sheets

Related U.S. Application Data continuation of application No. 15/825,719, filed on Nov. 29, 2017, now Pat. No. 10,416,472.

(51) Int. Cl.
*G03B 17/17* (2021.01)
*G02B 13/00* (2006.01)
*H02K 33/12* (2006.01)
*H02K 1/34* (2006.01)
*H02K 41/03* (2006.01)

(52) U.S. Cl.
CPC .............. *G03B 5/00* (2013.01); *G03B 17/17* (2013.01); *H02K 1/34* (2013.01); *H02K 33/12* (2013.01); *H02K 41/031* (2013.01); *G03B 2205/003* (2013.01); *G03B 2205/0023* (2013.01); *G03B 2205/0069* (2013.01); *H02K 2201/18* (2013.01)

(56) References Cited

U.S. PATENT DOCUMENTS

| | | | |
|---|---|---|---|
| 6,249,367 | B1 | 6/2001 | Hirose |
| 11,397,304 | B2 * | 7/2022 | Kao .......................... G02B 7/08 |
| 2004/0012683 | A1 * | 1/2004 | Yamasaki ........... H04N 5/23248 |
| | | | 348/208.1 |
| 2004/0114110 | A1 | 6/2004 | Shin |
| 2006/0268431 | A1 * | 11/2006 | Jin ....................... G02B 27/646 |
| | | | 359/726 |
| 2007/0091429 | A1 | 4/2007 | Moon et al. |
| 2007/0139752 | A1 | 6/2007 | Bernstein et al. |
| 2008/0169891 | A1 | 7/2008 | Umeda et al. |
| 2008/0252873 | A1 | 10/2008 | Onojima |
| 2009/0097833 | A1 | 4/2009 | Imada |
| 2009/0122406 | A1 | 5/2009 | Rouvinen et al. |
| 2010/0165132 | A1 | 7/2010 | Tokiwa et al. |
| 2011/0069363 | A1 | 3/2011 | Chikaoka et al. |
| 2012/0128339 | A1 | 5/2012 | Hu |
| 2012/0154614 | A1 | 6/2012 | Moriya et al. |
| 2013/0278785 | A1 | 10/2013 | Nomura et al. |
| 2014/0028863 | A1 | 1/2014 | Takei |
| 2014/0218799 | A1 | 8/2014 | Suzuka |
| 2015/0002683 | A1 | 1/2015 | Hu et al. |
| 2015/0042870 | A1 | 2/2015 | Chan et al. |
| 2016/0116758 | A1 | 4/2016 | Nomura et al. |
| 2016/0246029 | A1 | 8/2016 | Kim et al. |
| 2016/0370600 | A1 * | 12/2016 | Yu .......................... H02K 16/00 |
| 2017/0329111 | A1 | 11/2017 | Hu et al. |
| 2017/0353662 | A1 | 12/2017 | Enta |
| 2018/0024329 | A1 | 1/2018 | Goldenberg et al. |
| 2018/0321793 | A1 | 8/2018 | Jeong et al. |
| 2018/0329276 | A1 * | 11/2018 | Hu .......................... G03B 17/17 |
| 2021/0080744 | A1 | 3/2021 | Jeong et al. |
| 2021/0116716 | A1 * | 4/2021 | Jeong ....................... G03B 17/17 |
| 2022/0342276 | A1 * | 10/2022 | Min .......................... G03B 5/00 |

FOREIGN PATENT DOCUMENTS

| | | |
|---|---|---|
| CN | 101893812 A | 11/2010 |
| CN | 103460126 A | 12/2013 |
| CN | 203350572 U | 12/2013 |
| CN | 203799159 U | 8/2014 |
| CN | 104834315 A | 8/2015 |
| CN | 205139547 U | 4/2016 |
| CN | 105556385 A | 5/2016 |
| CN | 105911796 A | 8/2016 |
| CN | 207992655 U | 10/2018 |
| EP | 3 163 352 A1 | 5/2017 |
| JP | 2006-133281 A | 5/2006 |
| JP | 2007-228005 A | 9/2007 |
| JP | 2010-190984 A | 9/2010 |
| JP | 2016-12042 A | 1/2016 |
| KR | 1999-0031341 A | 5/1999 |
| KR | 2003-0030225 A | 4/2003 |
| KR | 10-2016-0042066 A | 4/2016 |
| WO | WO 2015/021279 A1 | 2/2015 |
| WO | WO 2016/103687 A1 | 6/2016 |
| WO | WO 2016/166730 A1 | 10/2016 |

OTHER PUBLICATIONS

Chinese Office Action dated Dec. 31, 2021, in counterpart Chinese Patent Application No. 202110190157.5 (14 pages in English and 10 pages in Chinese).

Chinese Office Action dated Mar. 16, 2020 in counterpart Chinese Patent Application No. 201810122947.8 (13 pages in English, 10 pages in Chinese).

Korean Office Action dated Aug. 29, 2018 in counterpart Korean Patent Application No. 10-2017-0020555 (8 pages in English, 5 pages in Korean).

Korean Office Action dated Feb. 27, 2019 in counterpart Korean Patent Application No. 10-2017-0020555 (8 pages in English, 5 pages in Korean).

United States Office Action dated Apr. 6, 2022, in related U.S. Appl. No. 17/134,080. (15 pages in English).

Chinese Office Action dated Apr. 26, 2022, in counterpart Chinese Patent Application No. 202011320554.1 (11 pages in English and 6 pages in Chinese).

* cited by examiner 1001,1002,1003

1001

REFLECTING MODULE FOR OIS AND CAMERA MODULE INCLUDING THE SAME

CROSS-REFERENCE TO RELATED APPLICATION(S)

This application is a continuation of U.S. patent application Ser. No. 16/535,132 filed on Aug. 8, 2019, which is a continuation of U.S. patent application Ser. No. 15/825,719 filed on Nov. 29, 2017, now issued as U.S. Pat. No. 10,416,472, which claims the benefit under 35 USC § 119(a) of Korean Patent Application No. 10-2017-0020555 filed on Feb. 15, 2017 in the Korean Intellectual Property Office, the entire disclosures of which are incorporated herein by reference for all purposes.

BACKGROUND

1. Field

The description relates to a reflecting module for optical image stabilization (OIS) and a camera module including the same.

2. Description of Related Art

Recently, camera modules have been generally installed in portable electronic devices such as tablet personal computers (PCs), laptop PCs, and the like, as well as in smartphones, and an autofocusing function, an optical image stabilization (OIS) function, a zoom function, and the like, have been implemented in camera modules for mobile terminals.

However, in order to implement various functions, the structures of such camera modules have become complicated and the sizes thereof have increased, resulting in difficulty in mounting such camera modules in portable electronic devices.

In addition, when a lens or an image sensor is directly moved for the purpose of optical image stabilization, both a weight of the lens or of the image sensor itself and weights of other members to which the lens or the image sensor is attached should be considered, and a certain level or more of driving force is thus required, resulting in increased power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a reflecting module for optical image stabilization (OIS) includes a housing including an internal space, a movable holder supported in the internal space of the housing by an elastic member, a reflecting member disposed on the movable holder, and a driving part configured to provide driving force to the movable holder so that the movable holder moves relative to the housing, wherein the elastic member includes a fixed frame fixed to the housing, a movable frame disposed in the fixed frame, and a spring connecting the fixed frame and the movable frame to each other, and the movable frame movable in relation to first and second axial directions perpendicular to each other.

The spring may include a first spring extended in the first axial direction and a second spring extended in the second axial direction, the first spring and the second spring integral with each other.

The first spring may include one or more springs extended in the first axial direction, and the second spring may include one or more springs extended in the second axial direction.

The spring may include a connection portion between the first spring and the second spring having a bent or angular shape.

Upper and lower surfaces of the fixed frame and the spring may be substantially coplanar with each other.

The reflecting member may be disposed to be exposed within the movable frame.

The reflecting member may be disposed to penetrate through and fit into the movable frame.

The movable holder may be fixed to the movable frame.

In one general aspect, a reflecting module for OIS includes a housing including an internal space, a gimbal disposed in the internal space of the housing, a reflecting member disposed on the gimbal, and a driving part configured to provide driving force to the reflecting member so that the reflecting member moves relative to the housing, wherein the gimbal comprises a fixed frame fixed to the housing, a first movable frame disposed in the fixed frame, and a second movable frame disposed in the first movable frame, and the reflecting member being fixed to the second movable frame to cover one surface of the first movable frame and one surface of the second movable frame, and the reflecting member is out of contact with the fixed frame and the first movable frame when the driving part is idle.

The fixed frame and the first movable frame may be connected to each other by a second axis member extended in a second axial direction, and the first movable frame and the second movable frame may be connected to each other by a first axis member extended in a first axial direction perpendicular to the second axial direction.

The first movable frame may be movable in relation to the first axial direction, and the second movable frame may be movable in relation to the second axial direction.

A protruding portion of the one surface of the second movable frame may protrude with respect to the one surface of the first movable frame, and the reflecting member may be fixed to the protruding portion.

The driving part may include coils disposed on the housing and magnets disposed on the gimbal.

The driving part may include coils disposed on the housing and magnets disposed on the second movable frame.

Two or more of the magnets may be disposed on the first movable frame, and two or more of the magnets may be disposed on the second movable frame.

In one general aspect, a camera module includes a lens module including lenses, and a reflecting module for OIS as described above disposed in front of the lens module and configured to change a path of light incident onto the reflecting module so that the light is directed toward the lens module.

An optical axis of the lenses may be generally perpendicular to a direction of the incident light to the camera module.

A portable electronic device may include the camera module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
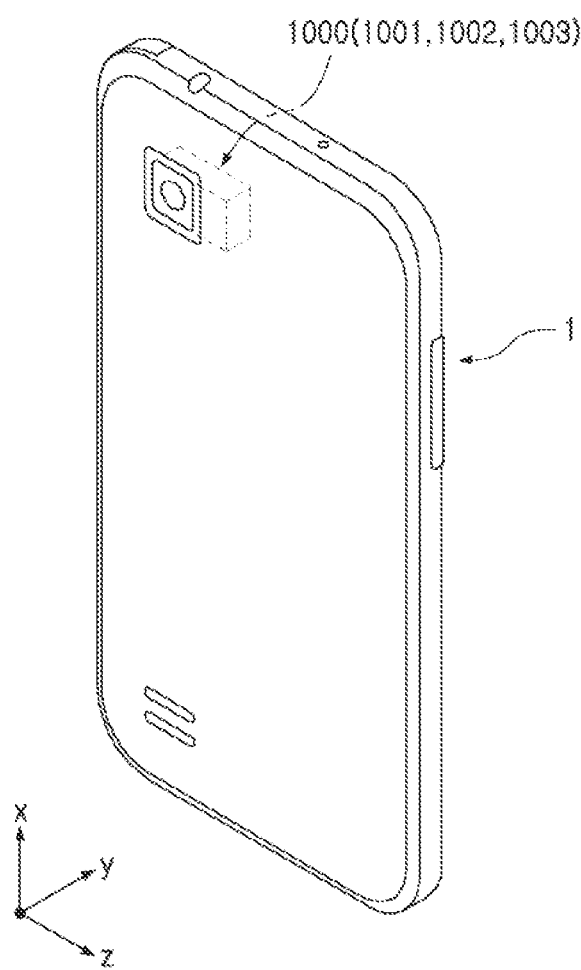
FIG. 1 is a perspective view of a portable electronic device according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a perspective view of a portable electronic device according to an embodiment.

Referring to FIG. 1, a portable electronic device 1 according to an embodiment may be a portable electronic device such as a mobile communications terminal, a smartphone, a tablet personal computer (PC), or the like, in which a camera module 1000 is mounted.

As shown in FIG. 1, the portable electronic device 1 is provided with the camera module 1000 to capture an image of a subject.

In an embodiment, the camera module 1000 includes lenses, and an optical axis (a Z axis) of each of the lenses is directed toward a direction perpendicular to a thickness direction (a Y-axis direction or a direction from a front surface of the portable electronic device to a rear surface thereof or an opposite direction to the direction from the front surface of the portable electronic device to the rear surface thereof) of the portable electronic device 1.

In an embodiment, the optical axis (the Z axis) of each of the lenses included in the camera module 1000 is formed in a width or length direction of the portable electronic device 1 rather than the thickness direction of the portable electronic device 1 (as an example, a structure in which the lenses are stacked in the width direction is illustrated in FIG. 1).

Therefore, even in the case that the camera module 1000 has functions such as an autofocusing (AF) function, a zoom function, an optical image stabilization (hereinafter, referred to as OIS) function, a thickness of the portable electronic device 1 is not increased. Therefore, the portable electronic device 1 may be miniaturized.

The camera module 1000 according to an embodiment has one or more of the AF function, the zoom function, and the OIS function.

Since the camera module 1000 including the AF function, the zoom function, the OIS function needs to include various components, a size of the camera module is increased as compared to a general camera module.

When the size of the camera module 1000 is increased, a problem occurs in miniaturizing the portable electronic device 1 in which the camera module 1000 is mounted.

For example, when the number of stacked lenses in the camera module is increased for the purpose of the zoom function and stacked lenses are disposed in the camera module in the thickness direction of the portable electronic device, a thickness of the portable electronic device is also increased depending on the number of stacked lenses. Therefore, when the thickness of the portable electronic device is not increased, the number of stacked lenses may not be sufficiently secured, such that zoom performance deteriorates.

In addition, an actuator moving a lens group in an optical axial direction or a direction perpendicular to the optical axis needs to be installed in order to implement the AF function and the OIS function, and when the optical axis (the Z axis) of the lens group is formed in the thickness direction of the portable electronic device, the actuator moving the lens group needs also to be installed in the thickness direction of the portable electronic device. Therefore, a thickness of the portable electronic device is increased.

However, in the camera module 1000 according to an embodiment, the optical axis (the Z axis) of each of the lenses is disposed perpendicularly to the thickness direction of the portable electronic device 1. Therefore, even in the case that the camera module 1000 having the AF function, the zoom function, and the OIS function is mounted in the portable electronic device 1, the portable electronic device 1 may be miniaturized.

Figure 2:
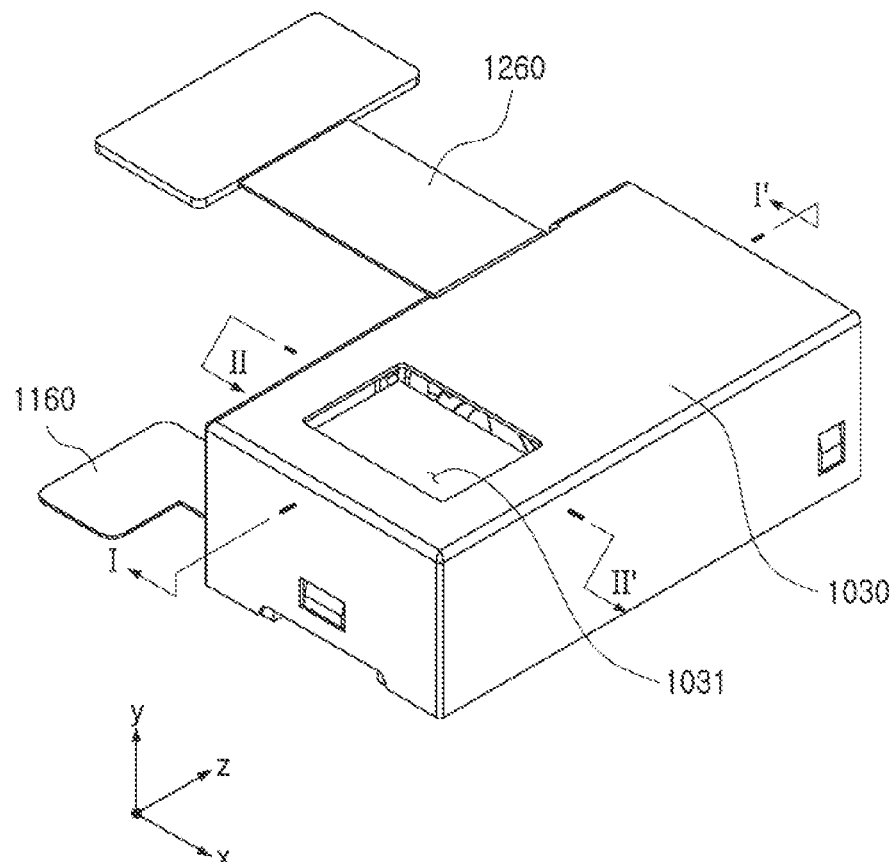
FIG. 2 is a perspective view of a camera module according to embodiments.
Figure 3:
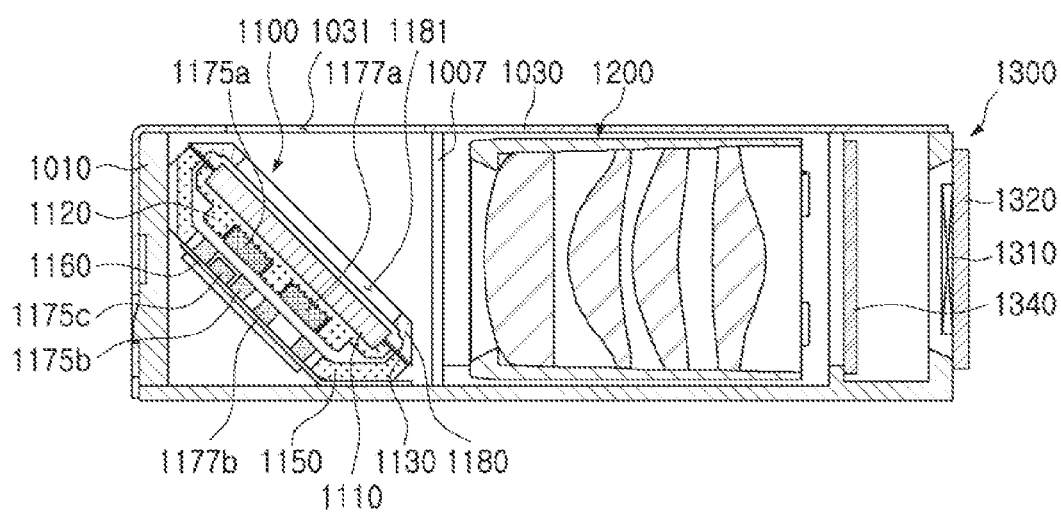
FIG. 3 is a cross-sectional view of a camera module according to an embodiment.

FIG. 2 is a perspective view of a camera module according to embodiments, and FIG. 3 is a cross-sectional view of a camera module according to an embodiment.

Referring to FIGS. 2 and 3, a camera module 1001 according to an embodiment includes a reflecting module 1100 for OIS (hereinafter, referred to as a 'reflecting module'), a lens module 1200, and an image sensor module 1300 provided in a case 1010.

The reflecting module 1100 changes a direction of light. As an example, a moving direction of light incident through an opening 1031 of a cover 1030 covering an upper portion of the camera module 1001 is changed through the reflecting module 1100 so that the light is directed toward the lens module 1200. To this end, the reflecting module 1100 includes a reflecting member 1110 reflecting the light. A path of the light incident to the reflecting module 1100 is changed by the reflecting member 1110.

Therefore, a path of the light incident through the opening 1031 is changed by the reflecting module 1100 so that the light is directed toward the lens module 1200. For example, a path of light incident in the thickness direction (the Y-axis direction) of the camera module 1001 is changed by the reflecting module 1100 to coincide with the optical axial direction (a Z-axial direction).

The lens module 1200 includes lenses through which the light of which the moving direction is changed by the reflecting module 1100 passes, and the image sensor module 1300 includes an image sensor 1310 converting the light passing through the lenses into an electrical signal and a printed circuit board 1320 on which the image sensor 1310 is mounted. In addition, the image sensor module 1300 includes an optical filter 1340 filtering the light incident from the lens module 1200 thereto. The optical filter 1340 may be an infrared cut-off filter.

In the case 1010, the reflecting module 1100 is provided in front of the lens module 1200, and the image sensor module 1300 is provided behind the lens module 1200.

Figure 4:
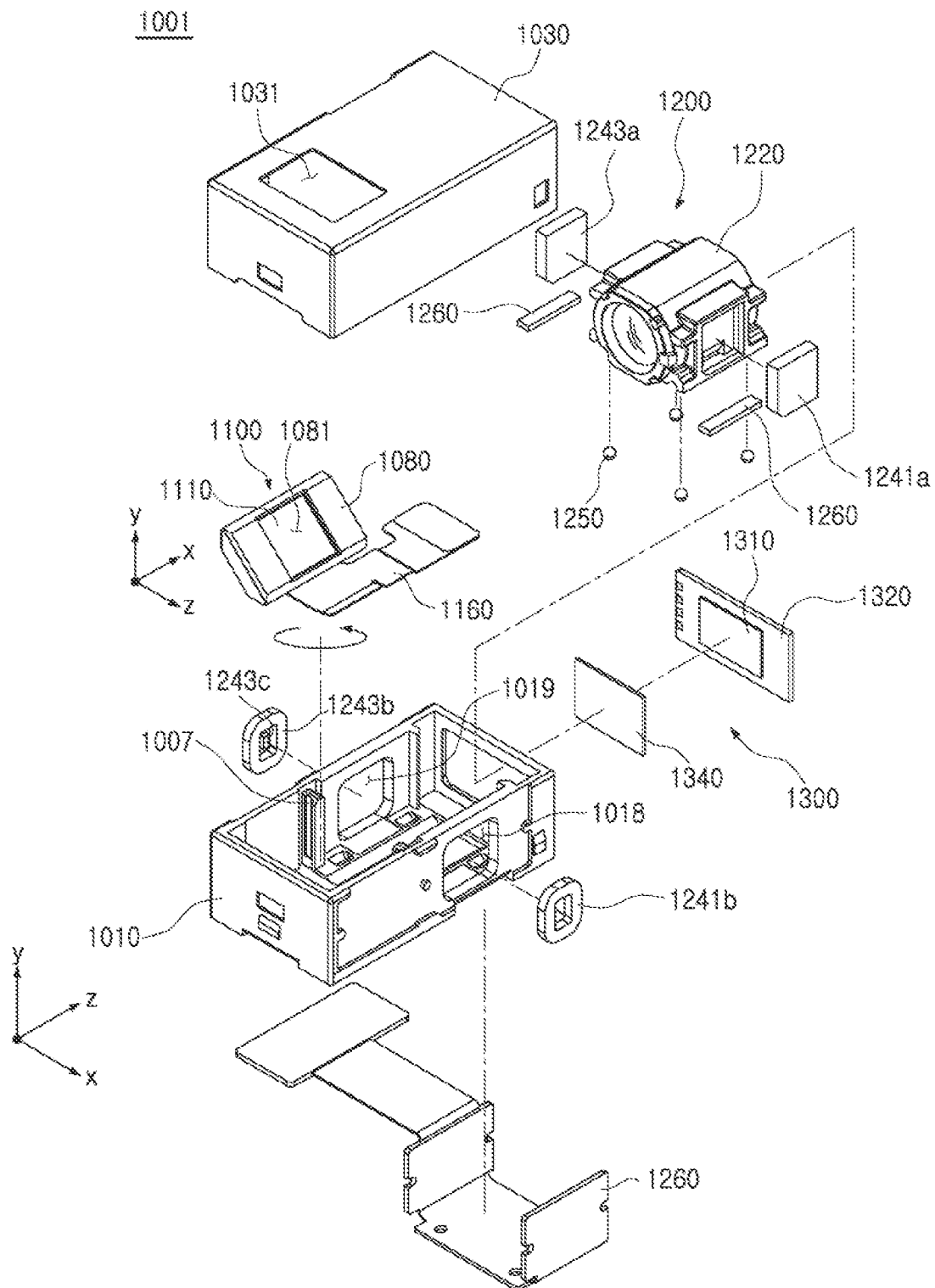
FIG. 4 is an exploded perspective view of the camera module according to an embodiment.
Figure 5:
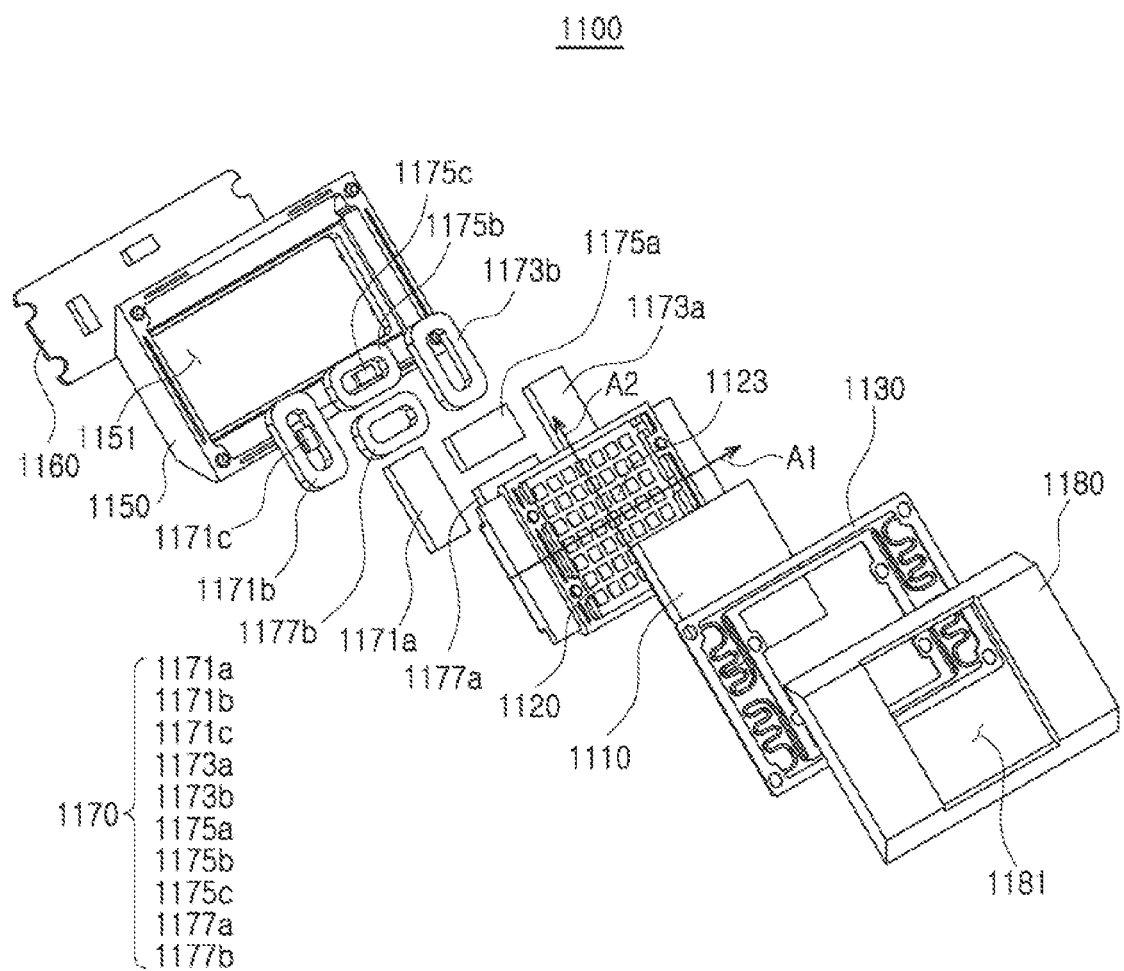
FIG. 5 is an exploded perspective view of a reflecting module of the camera module according to an embodiment.
Figure 6:
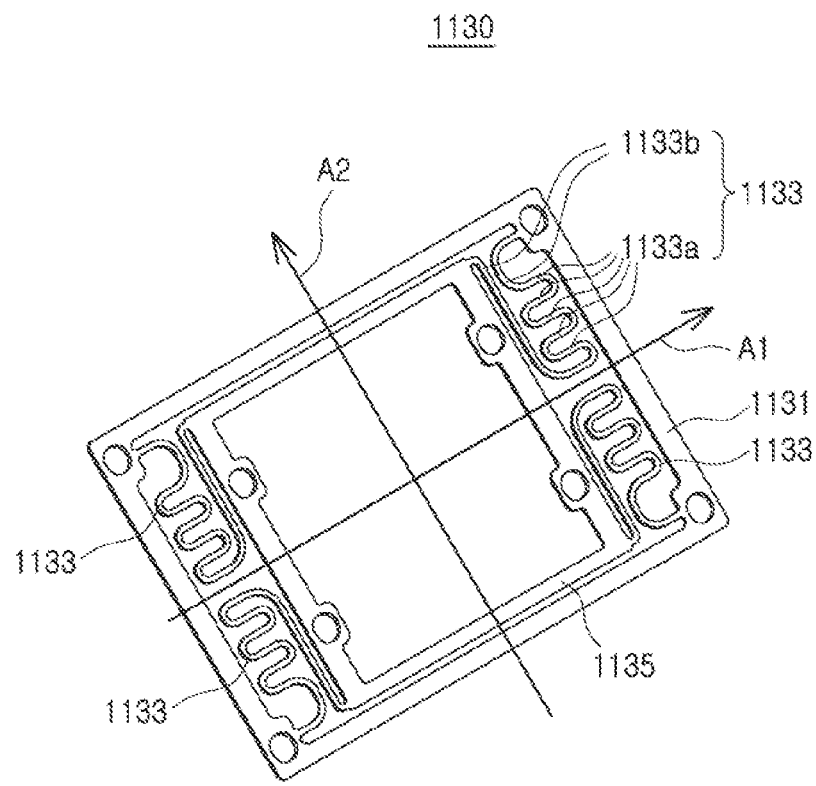
FIG. 6 is a perspective view of an elastic member of the camera module according to an embodiment.

FIG. 4 is an exploded perspective view of a camera module according to an embodiment, FIG. 5 is an exploded perspective view of a reflecting module of a camera module according to an embodiment, and FIG. 6 is a perspective view of an elastic member of a camera module according to an embodiment.

Referring to FIGS. 2 through 6, the camera module 1001 according to an embodiment includes the reflecting module 1100, the lens module 1200, and the image sensor module 1300 provided in the case 1010.

The case 1010 includes the reflecting module 1100, the lens module 1200, and the image sensor module 1300 sequentially provided from one side thereof to the other side thereof. The case 1010 has an internal space into which the reflecting module 1100, the lens module 1200, and the image sensor module 1300 are disposed (the image sensor module 1300 may be attached to an outer portion of the case 1010).

Here, as shown in the drawings, the case 1010 is entirely integrally provided so that both of the reflecting module 1100 and the lens module 1200 are disposed into the internal space of the case 1010. In addition, the case 1010 may be provided integrally with a housing 1150 of the reflecting module 1100, such that the other components of the reflecting module 1100 are directly provided in the case 1010 (in this case, the case 1010 and the housing 1150 are essentially the same). Alternatively, the reflecting module 1100 and the lens module 1200 may be separately provided, and may be attached and connected to each other to form the case 1010.

In addition, the case 1010 is covered by the cover 1030 so that the internal space of the case 1010 is not visible.

The cover 1030 has the opening 1031 through which light is incident, and a direction of the light incident through the opening 1031 is changed by the reflecting module 1100, such that the light is incident to the lens module 1200. The cover 1030 is integrally provided to cover the entire case 1010, or may be provided as separate members each covering the reflecting module 1100 and the lens module 1200.

To this end, the reflecting module 1100 includes the reflecting member 1110 reflecting the light. In addition, the light incident to the lens module 1200 passes through the lenses and is converted into and stored as an electrical signal by the image sensor 1310.

The case 1010 includes the reflecting module 1100 and the lens module 1200 disposed in the internal space thereof. Therefore, in the internal space of the case 1010, a space in which the reflecting module 1100 is disposed and a space in which the lens module 1200 is disposed are distinguished from each other by protruding walls 1007 (However, the space in which the reflecting module 1100 is disposed and the space in which the lens module 1200 is disposed may be provided in an entirely one space without being separately distinguished from each other). In addition, the reflecting module 1100 is provided in front of the protruding walls 1007, and the lens module 1200 is provided behind the protruding walls 1007. The protruding walls 1007 protrude from opposite sides of the case 1010 to the internal space.

In addition, the case 1010 includes a first driving part 1170 and a second driving part 1240 each provided in order to drive the reflecting module 1100 and the lens module 1200. The first driving part 1170 includes coils 1171b, 1173b, 1175b, and 1177b for driving the reflecting module 1100, and the second driving part 1240 includes coils 1241b and 1243b for driving the lens module 1200. In addition, the coils 1171b, 1173b, 1175b, 1177b, 241b, and 1243b are provided on the housing 1150 and the case 1010, respectively, in a state in which they are mounted on boards 1160 and 1260, respectively.

In addition, the housing 1150 is provided with a through-hole 1151 so that coils 1171b, 1173b, 1175b, and 1177b of the first driving part 1170 are exposed to an inner portion of the housing 1150, and are provided with through-holes 1018 and 1019 so that the coils 1241b and 1243b of the second driving part 1240 are exposed to the internal space in order to drive the case 1010.

In addition, the boards 1160 and 1260 on which the coils 1171b, 1173b, 1175b, 1177b, 1241b, and 1243b are mounted are flexible printed circuit boards (FPCBs) or rigid PCBs (RPCBs), and when the boards 1160 and 1260 are the FPCBs, reinforcing plates (not illustrated) may be provided on lower surfaces of the boards in order to reinforce rigidity of the boards.

The reflecting module 1100 changes the path of the light incident thereto through the opening 1031. When an image or a moving image is captured, the image may be blurred or the moving image may be shaken due to a hand-shake, or the like, of a user. In this case, the reflecting module 1100 corrects the hand-shake, or the like, of the user by moving a moving holder 1120 on which the reflecting member 1110 is mounted. For example, when shaking is generated at the time of capturing the image or the moving image due to the hand-shake of the user, a relative displacement corresponding to shaking is provided to the moving holder 1120 to compensate for shaking.

In addition, in an embodiment, the OIS function is implemented by the movement of the moving holder 1120 having a relatively low weight since it does not include lenses, and the like, and power consumption is thus significantly reduced.

That is, in an embodiment, the light on which the OIS is performed is incident to the lens module 1200 by changing the direction of the light by the movement of the moving holder 1120 on which the reflecting member 1110 is provided without moving the lens barrel including the lenses or the image sensor in order to implement the OIS function.

The reflecting module 1100 includes the reflecting member 1110, the moving holder 1120 having the reflecting member 1110 mounted thereon, an elastic member 1130 supporting the moving holder 1120 so that the moving holder 1120 is moved, the housing 1150 having the elastic member 1130 fixedly coupled thereto so that the moving holder 1120 is provided in an internal space thereof, the board 1160 coupled to the housing 1150, and the first driving part 1170 including the coils 1171b, 1173b, 1175b, and 1177b and hall sensors 1171c and 1175c provided on the board 1160 and magnets 1171a, 1173a, 1175a, and 1177a provided on the moving holder 1120. The reflecting module includes a cover 1180 disposed on the housing 1150 and having an opening 1181 through which the reflecting member 1110 is exposed.

The reflecting member 1110 changes the direction of the light. For example, the reflecting member 1110 may be a mirror or a prism reflecting the light (a case in which the reflecting member 1110 is the mirror is illustrated in the drawings associated with the first exemplary embodiment for convenience of explanation).

The reflecting member 1110 is fixed to the moving holder 1120. The moving holder 1120 has a mounting surface 1123 on which the reflecting member 1110 is mounted.

The mounting surface 1123 of the moving holder 1120 may be an inclined surface so that the path of the light is changed. For example, the mounting surface 1123 is an inclined surface inclined with respect to the optical axis (the Z axis) at 45°. In addition, the inclined surface of the moving holder 1120 may be directed toward the opening 1031 of the cover 1030 through which the light is incident.

The moving holder 1120 on which the reflecting member 1110 is mounted is movably accommodated in the internal space of the housing 1150. In other words, the moving holder 1120 is moved by an action of the first driving part 1170 so that a relative interval between the moving holder 1120 and the housing 1150 is changed, depending on each position of the moving holder 1120.

The moving holder 1120 is movably fixed to the elastic member 1130. The elastic member 1130 is also fixed to the housing 1150, and the moving holder 1120 is moved relative to the housing 1150 by driving of the first driving part 1170. Therefore, the OIS may be performed.

The elastic member 1130 includes a fixed frame 1131 fixed to the housing 1150, a moving frame 1135 provided in the fixed frame 1131 and fixed to the moving holder 1120, and a moving spring 1133 connecting the fixed frame 1131 and the moving frame 1135 to each other and rotatable around two axes (first and second axes). In addition, the fixed frame 1131, the moving spring 1133, and the moving frame 1135 may be provided integral with one another. In addition, the fixed frame 1131 and the moving frame 1135 have different sizes, but may have the same shape such as a polygonal shape or a round ring shape.

Here, since the moving holder 1120 is fixed to the housing 1150 by only the elastic member 1130, when the moving holder 1120 is moved in relation to the two axes (the first and second axes) by the first driving part 1170, the moving holder 1120 is not rotated around a rotation axis that is accurately fixed, and may be moved to be entirely biased in a direction in which force is applied to the moving holder 1120 by the first driving part 1170 (a direction in which the moving holder 1120 is pulled or pushed).

The moving spring 1133 has a structure in which a first spring 1133a extended in the first axis A1 direction and a second spring 1133b extended in the second axis A2 direction perpendicular to the first axis A1 direction are provided integral with each other (here, the first axis A1 and the second axis A2, axes provided along the inclined mounting surface 1123 of the moving holder 1120, may be axes perpendicular to each other). In addition, the first spring 1133a includes one or more springs extended in the first axis A1 direction, and the second spring 1133b includes one or more springs extended in the second axis A2 direction. In addition, a connection portion between the first spring 1133a and the second spring 1133b has a bent or angular shape (see the description for previously described embodiments and FIGS. 17 and 18, drawings related to an embodiment with respect to a case in which the connection portion between the first spring 1133a and the second spring 1133b has an angular shape). Since the moving spring 1133 is integrally provided and includes the spring provided along the first axis and the spring provided along the second axis, the moving spring 1133 freely rotates around the first axis and the second axis.

The first driving part 1170 generates driving force so that the moving holder 1120 is rotatable around the two axes (the first axis A1 and the second axis A2). Therefore, the moving holder 1120 may be moved so that an interval between the moving holder 1120 and a bottom surface of the housing 1150 in each portion is changed.

As an example, the first driving part 1170 includes the magnets 1171a, 1173a, 1175a, and 1177a and the coils 1171b, 1173b, 1175b, and 1177b disposed to face the magnets 1171a, 1173a, 1175a, and 1177a.

When power is applied to the coils 1171b, 1173b, 1175b, and 1177b, the moving holder 1120 on which the magnets 1171a, 1173a, 1175a, and 1177a are mounted rotates around the first axis and the second axis by electromagnetic interaction between the magnets 1171a, 1173a, 1175a, and 1177a and the coils 1171b, 1173b, 1175b, and 1177b.

The magnets 1171a, 1173a, 1175a, and 1177a are mounted on the moving holder 1120. As an example, the magnets 1171a, 1173a, 1175a, and 1177a are mounted on a lower surface of the moving holder 1120.

The coils 1171b, 1173b, 1175b, and 1177b are mounted on the housing 1150. As an example, the coils 1171b, 1173b, 1175b, and 1177b are mounted on the housing 1150 through the board 1160. That is, the coils 1171b, 1173b, 1175b, and 1177b are provided on the board 1160, and the board 1160 is mounted on the housing 1150. In addition, the housing 1150 is provided with the through-hole 1151 so that the coils 1171b, 1173b, 1175b, and 1177b provided on the board 1160 attached to an outer surface of the housing 1150 are exposed to the internal space of the housing 1150.

A reinforcing plate (not illustrated) may be mounted below the board 1160 in order to reinforce strength of the main board.

In an embodiment, when the moving holder 1120 is rotated, a closed loop control manner of sensing and feeding back a position of the moving holder 1120 is used.

Therefore, position sensors 1171c and 1175c are required in order to perform a closed loop control. The position sensors 1171c and 1175c may be hall sensors.

The position sensors 1171c and 1175c are disposed inside or outside the coils 1171b and 1175b, respectively, and are mounted on the board 1160 on which the coils 1171b and 1175b are mounted.

Meanwhile, the board 1160 may be provided with a gyro sensor (not illustrated) sensing shaking factor such as hand-shake, or the like, of the user, and may be provided with a driver integrated circuit (IC) (not illustrated) providing driving signals to the coils 1171b, 1173b, 1175b, and 1177b.

Figure 7A:
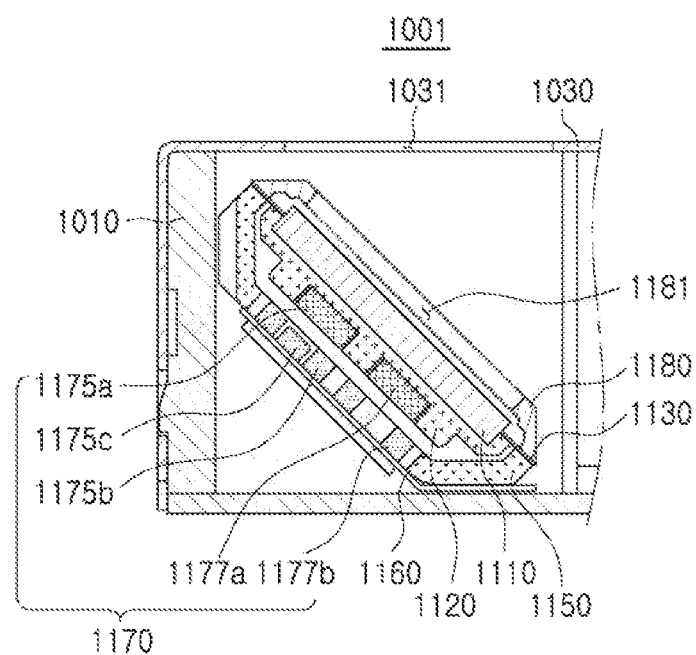
FIGS. 7A through 7C are schematic views of an example in which a moving holder according to an embodiment is moved in relation to a first axis.
Figure 7B:
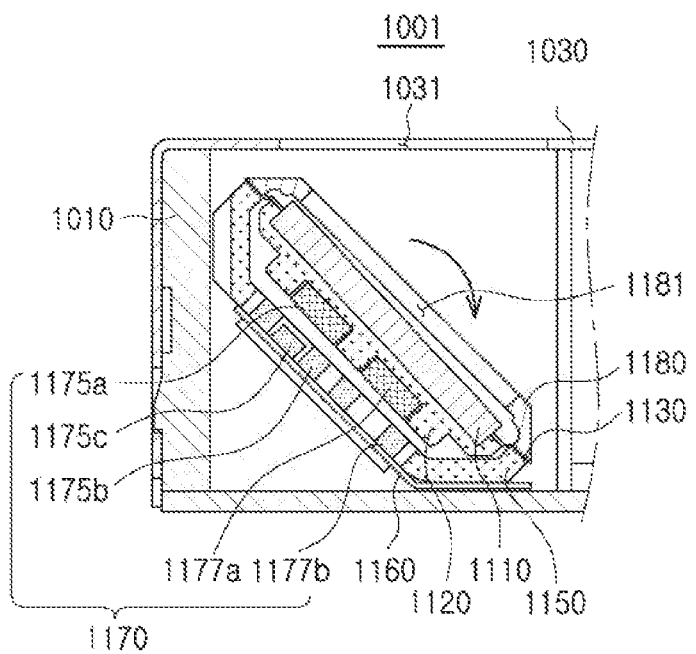
Figure 7C:
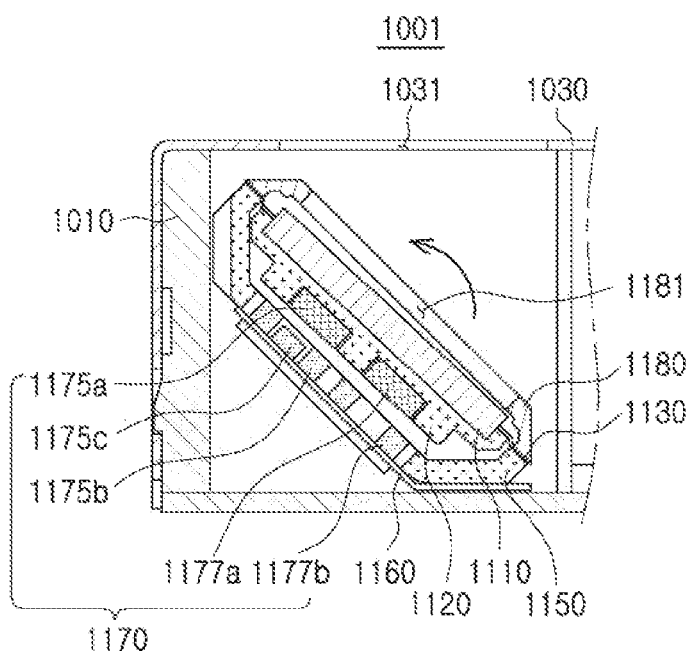
Figure 8A:
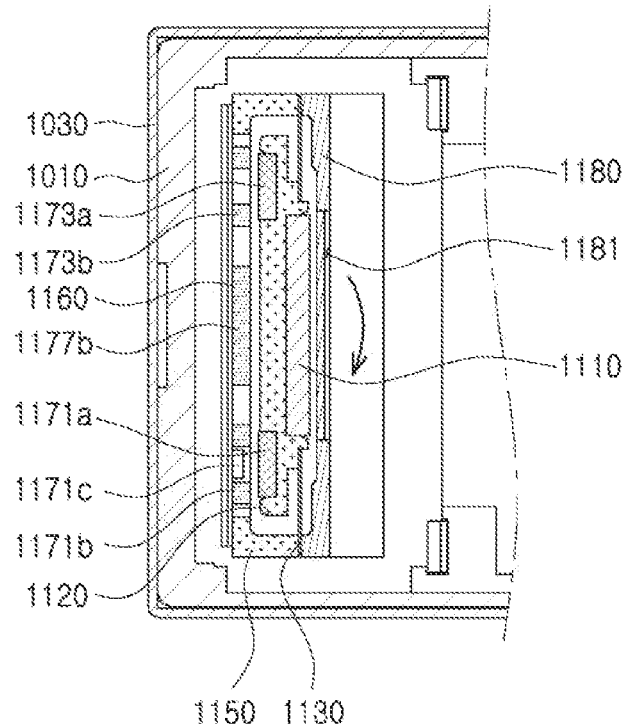
FIGS. 8A through 8C are schematic views of an example in which the moving holder according to an embodiment is moved in relation to a second axis.
Figure 8B:
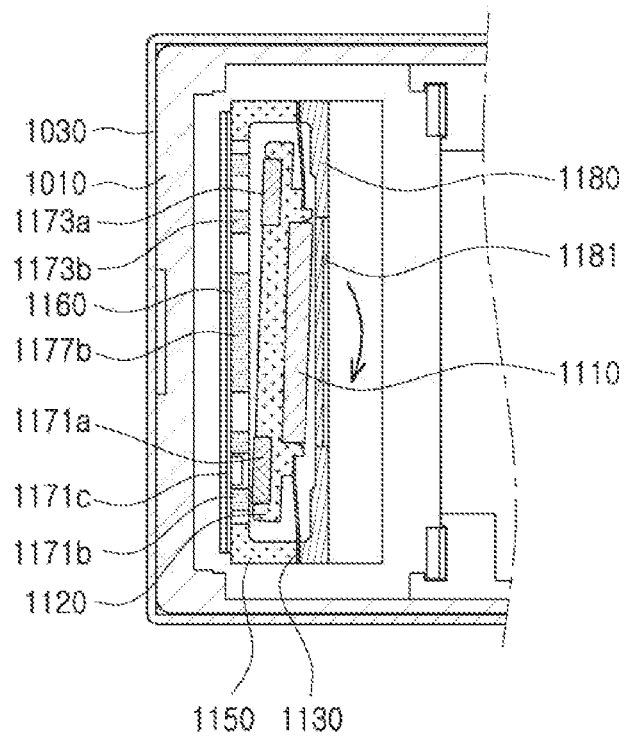
Figure 8C:
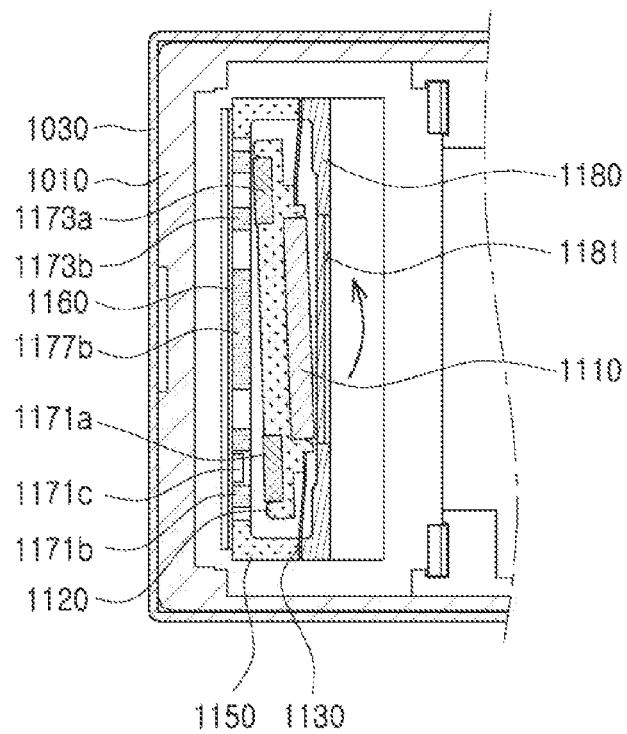

FIGS. 7A through 7C are schematic views of a manner in which a moving holder according to an embodiment is moved in relation to a first axis, and FIGS. 8A through 8C are schematic views of an example in which the moving holder according to an embodiment is moved in relation to a second axis.

Referring to FIGS. 7A through 7C, when the moving holder 1120 is moved in relation to the first axis A1, the magnets 1175a and 1177a and the coils 1175b and 1177b aligned in the second axis A2 direction perpendicular to the first axis A1 move toward or away from each other, respectively. That is, the moving holder 1120 is moved so that an interval between the magnet 1175a and the coil 1175b disposed at an upper portion in relation to the first axis A1 is greater or smaller than that between the magnet 1177a and the coil 1177b disposed at a lower portion in relation to the first axis A1.

In addition, referring to FIGS. 8A through 8C, when the moving holder 1120 is moved in relation to the second axis A2, the magnets 1171a and 1173a and the coils 1171b and 1173b aligned in the first axis A1 direction perpendicular to the second axis A2 move toward or away from each other, respectively. That is, the moving holder 1120 is moved so that an interval between the magnet 1173a and the coil 1173b disposed at an upper portion in relation to the second axis A2 is greater or smaller than that between the magnet 1171a and the coil 1171b disposed at a lower portion in relation to the second axis A2.

Figure 9:
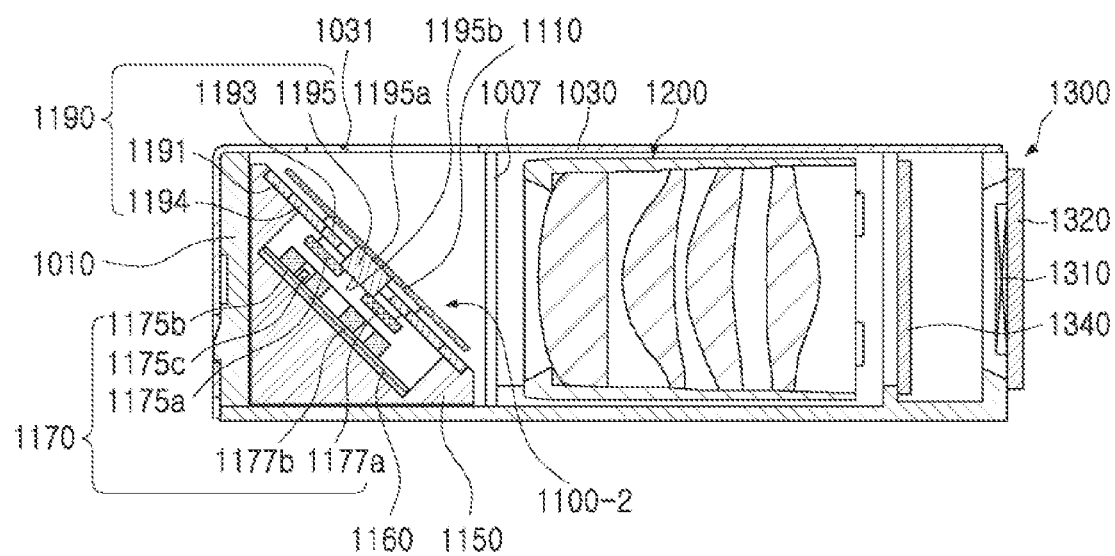
FIG. 9 is a cross-sectional view of a camera module according to an embodiment.
Figure 10:
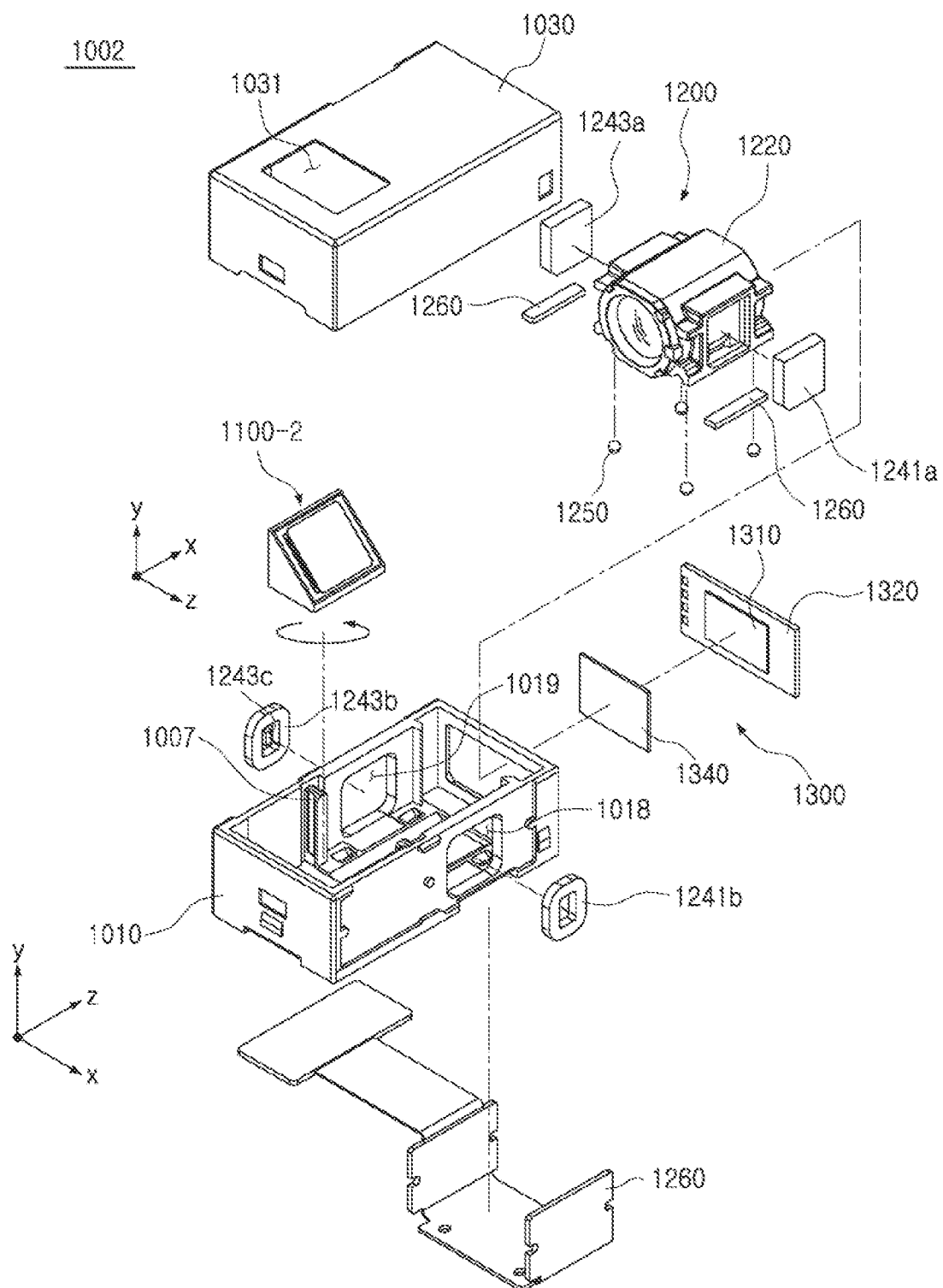
FIG. 10 is an exploded perspective view of the camera module according to an embodiment.
Figure 11:
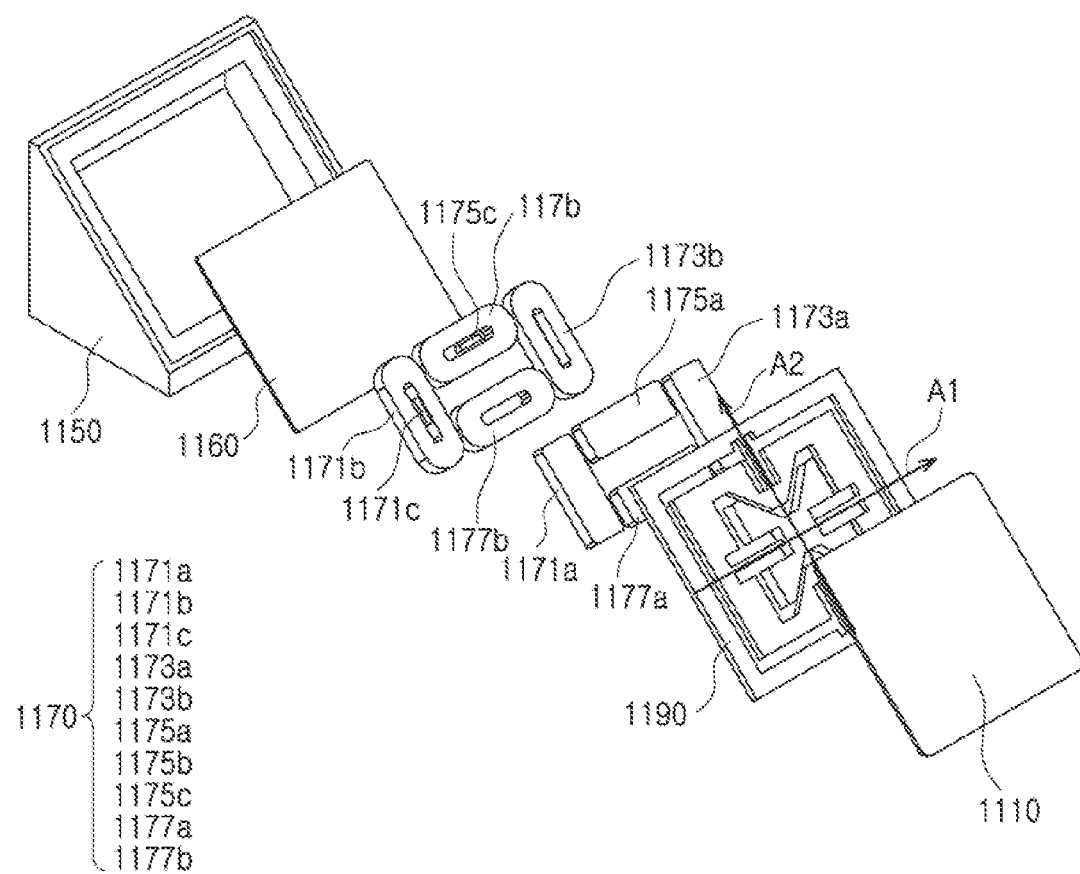
FIG. 11 is an exploded perspective view of a reflecting module of the camera module according to an embodiment.
Figure 12:
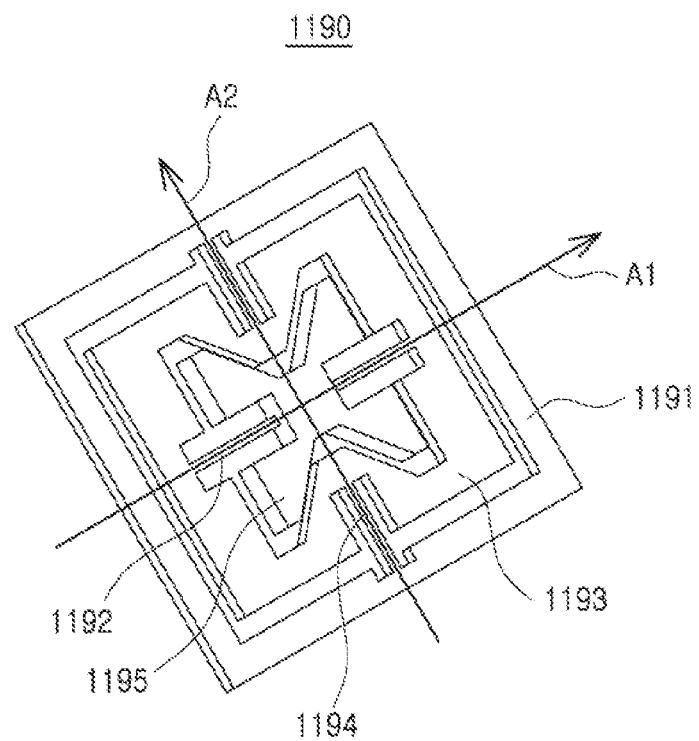
FIG. 12 is a perspective view of an elastic member (a gimbal) of the camera module according to an embodiment.

FIG. 9 is a cross-sectional view of a camera module according to an embodiment, FIG. 10 is an exploded perspective view of the camera module according to an embodiment, FIG. 11 is an exploded perspective view of a reflecting module of the camera module according to an embodiment, and FIG. 12 is a perspective view of an elastic member (a gimbal) of the camera module according to an embodiment.

Referring to FIGS. 2, and 9 through 12, all the components of a camera module 1002 according to an embodiment except for a reflecting module are the same as those of the camera module 1001 according to previous embodiments. Hereinafter, a configuration of the reflecting module will be described in detail, and previously described components will be denoted by the same reference numerals, and a detailed description thereof will be omitted.

The camera module 1002 according to an embodiment includes a reflecting module 1100-2, the lens module 1200, and the image sensor module 1300 provided in the case 1010.

The reflecting module 1100-2 according to an embodiment may be the same as the reflecting module 1100 according to previous embodiments except that it includes a gimbal 1190 corresponding to the moving holder 1120 and the elastic member 1130 of previous embodiments and provided as one member. Therefore, the gimbal 1190 will be described in detail, and other components of which relative positions, and the like, are changed will thus be briefly additionally described.

The gimbal 1190 includes a fixed frame 1191 fixed to the housing 1150, a first moving frame 1193 provided in the fixed frame 1191, and a second moving frame 1195 provided in the first moving frame 1193. In addition, the fixed frame 1191 and the first moving frame 1193 are connected to each other by a second axis member 1194 extended in the second axis A2 direction, and the first moving frame 1193 and the second moving frame 1195 are connected to each other by a first axis member 1192 extended in the first axis A1 direction perpendicular to the second axial direction A2. Therefore, the first moving frame 1193 is rotatable around the second axis A2, and the second moving frame 1195 is rotatable around the first axis A1 and the second axis A2. It is to be noted that since the second moving frame 1195 is always moved together with the first moving frame 1193 when the first moving frame 1193 is moved, in a case in which the first moving frame 1193 is rotated around the second axis A2, the first moving frame 1193 and the second moving frame 1195 are not moved relative to each other, and in a case in which the second moving frame 1195 is rotated around the first axis A1, the first moving frame 1193 is not moved, and the first moving frame 1193 and the second moving frame 1195 are thus moved relative to each other.

Here, the fixed frame 1191, the first moving frame 1193, and the second moving frame 1195 have different sizes, but may have the same shape such as a polygonal shape or a round ring shape.

Meanwhile, magnets 1171*a*, 1173*a*, 1175*a*, and 1177*a* are provided on a lower surface of the reflecting module 1100-2 according to an embodiment, and a reflecting member 1110 is provided on an upper surface of the reflecting module 1100-2.

In addition, at the time of performing OIS driving, the second moving frame 1195 is always involved in the OIS driving to perform a rotary motion, and all of the magnets 1171*a*, 1173*a*, 1175*a*, and 1177*a* are provided on the second moving frame 1195 of the gimbal 1190. Alternatively, the magnets 1171*a* and 1175*a* involved in rotation around the second axis A2 among the plurality of magnets 1171*a*, 1173*a*, 1175*a*, and 1177*a* are provided on the first moving frame 1193, and the other magnets 1173*a* and 1177*a* are provided on the second moving frame 1195.

In addition, the reflecting member 1110 is provided on the upper surface of the reflecting module 1100-2. In this case, the second moving frame 1195 is rotated relative to the fixed frame 1191 and the first moving frame 1193 when it is rotated around the first axis A1, and may be rotated relative to the fixed frame 1191 when it is rotated around the second axis A2. In addition, since the reflecting member 1110 is coupled to an upper surface of the second moving frame 1195, a portion of the second moving frame 1195 includes a protruding portion 1195*a* protruding in an upward direction so that the reflecting member 1110 does not interfere in the fixed frame 1191 and the first moving frame 1193 when the reflecting member 1110 is rotated around the first axis A1, resulting in allowing the reflecting member 1110 to maintain a certain interval from the fixed frame 1191 and the first moving frame 1193 when the OIS driving is not performed (see the cross-sectional view of FIG. 9).

In addition, a portion of the second moving frame 1195 includes a protruding portion 1195*b* protruding in a downward direction, resulting in allowing the magnets 1175*a* and 1177*a* fixedly mounted on the second moving frame 1195 to maintain a certain interval from the fixed frame 1191 and the first moving frame 1193 when the OIS driving is not performed (see the cross-sectional view of FIG. 9). This is also to allow the magnets 1175*a* and 1177*a* not to interfere in the fixed frame 1191 and the first moving frame 1193 when the second moving frame 1195 is rotated around the first axis A1 and the second axis A2. Even in the case that the protruding portion 1195*b* is not included in the second moving frame 1195, shapes or sizes of the magnets 1175*a* and 1177*a* may be optimized to allow the magnets 1175*a* and 1177*a* not to interfere in the fixed frame 1191 and the first moving frame 1193 even in the case that the second moving frame 1195 is rotated in a state in which the magnets 1175*a* and 1177*a* are mounted on the second moving frame 1195.

Figure 13A:
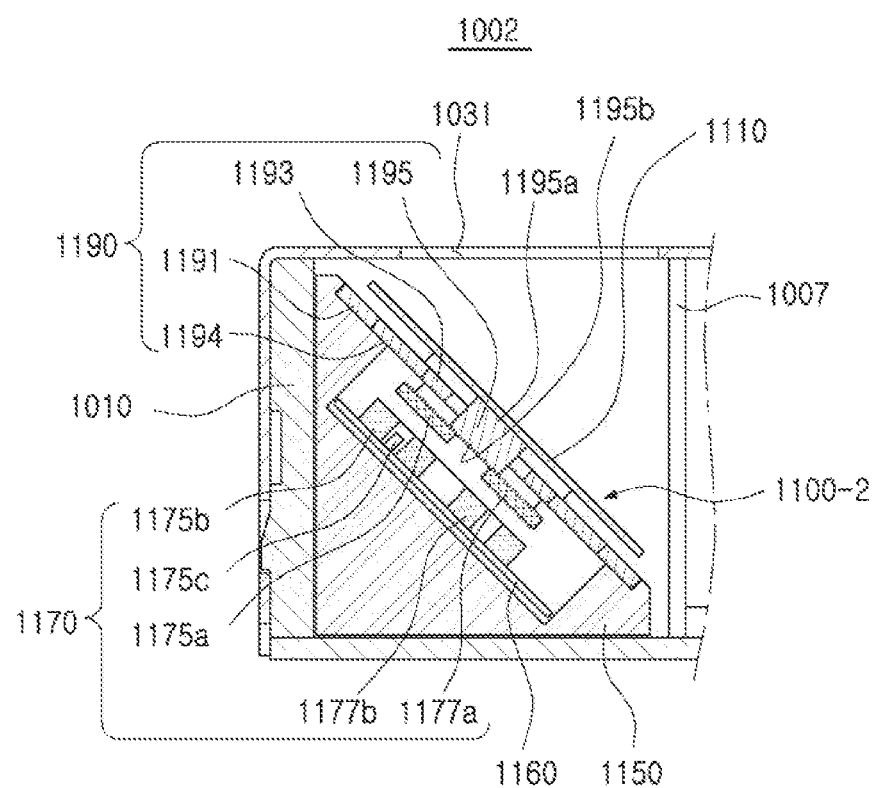
FIGS. 13A through 13C are schematic views of an example in which a reflecting member according to an embodiment is rotated around a first axis.
Figure 13B:
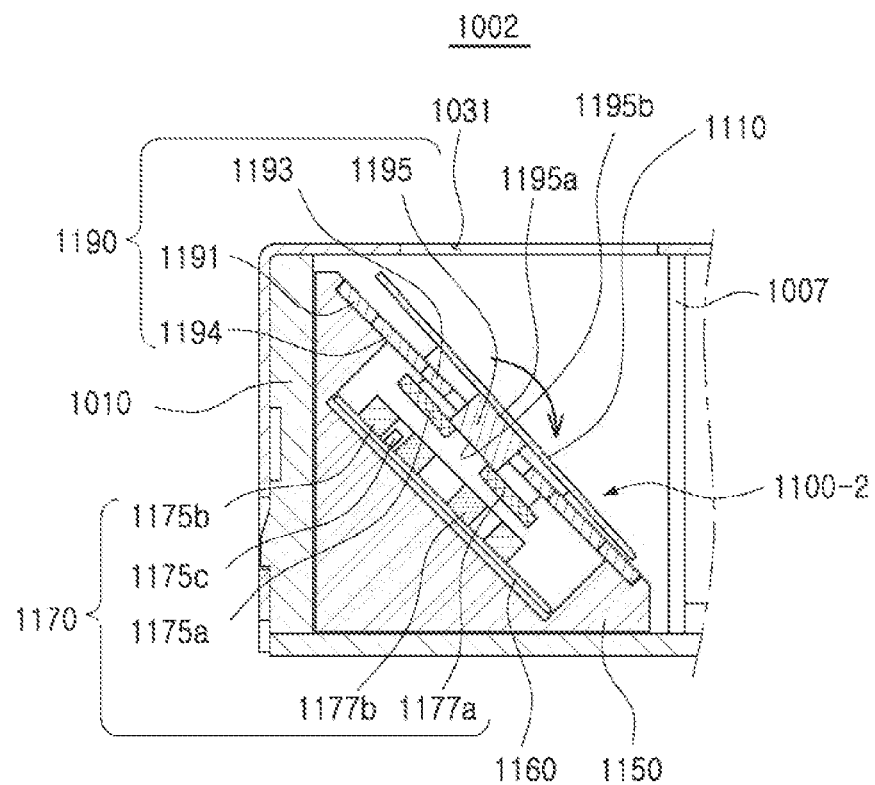
Figure 13C:
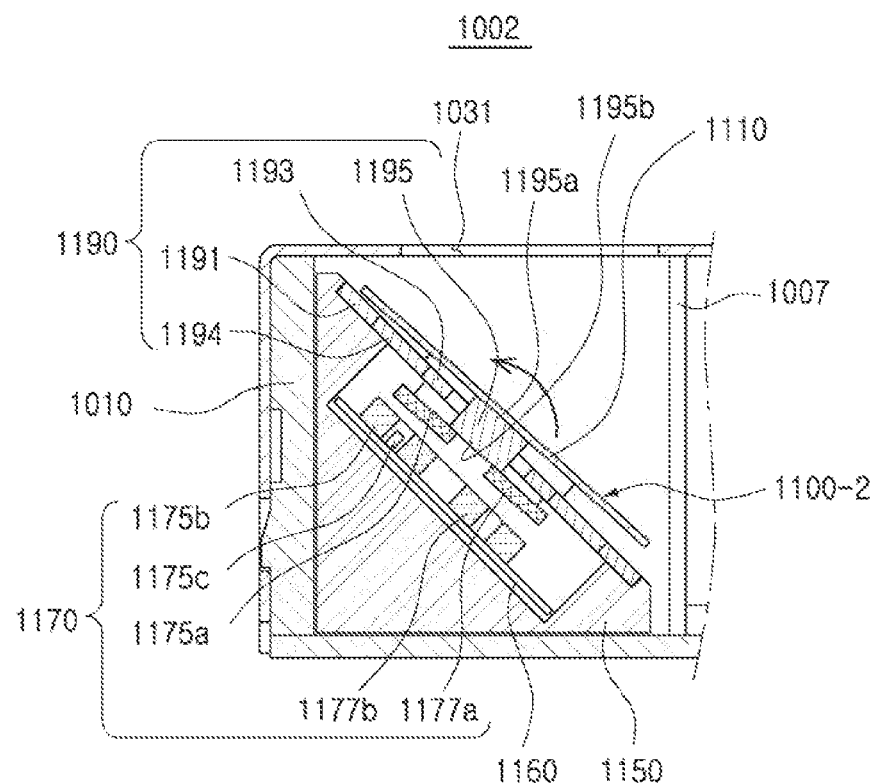
Figure 14A:
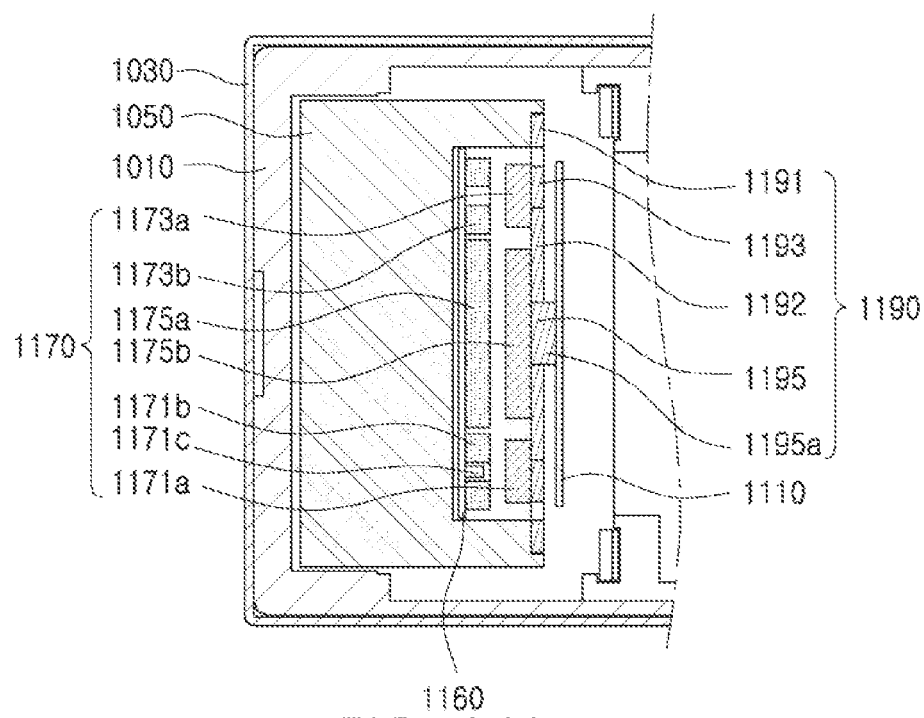
FIGS. 14A through 14C are schematic views of an example in which the reflecting member according to an embodiment is rotated around a second axis.
Figure 14B:
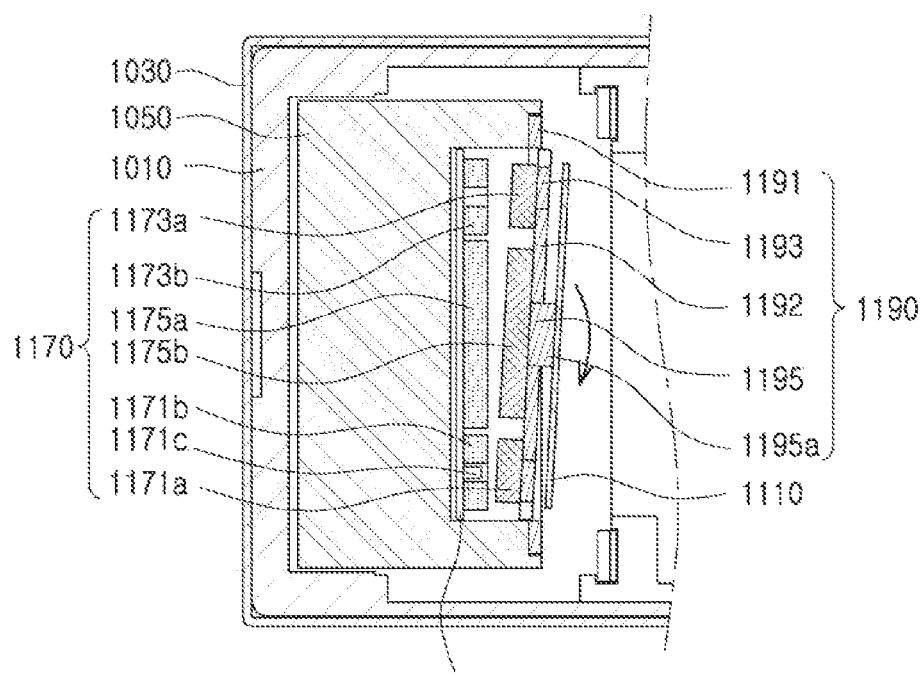
Figure 14C:
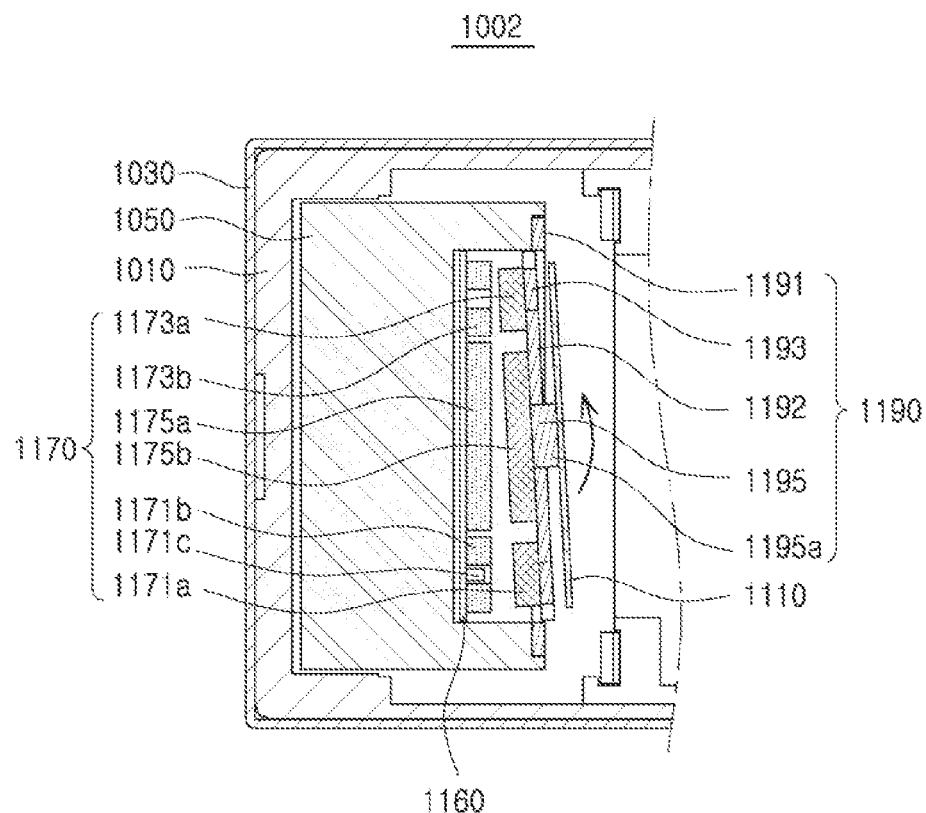

FIGS. 13A through 13C are schematic views of an example in which a reflecting member according to an embodiment is rotated around a first axis, and FIGS. 14A through 14C are schematic views of an example in which the reflecting member according to an embodiment is rotated around a second axis.

Referring to FIGS. 13A through 13C, when the reflecting member 1110 is moved in relation to the first axis A1, the magnets 1175*a* and 1177*a* and the coils 1175*b* and 1177*b* aligned in the second axis A2 direction perpendicular to the first axis A1 move toward or away from each other, respectively. That is, the reflecting member 1110 is moved so that an interval between the magnet 1175*a* and the coil 1175*b* disposed at an upper portion in relation to the first axis A1 is greater or smaller than that between the magnet 1177*a* and the coil 1177*b* disposed at a lower portion in relation to the first axis A1. In this case, the second moving frame 1195 is singly rotated together with the reflecting member 1100 to be thus rotated relative to the fixed frame 1191 and the first moving frame 1193.

In addition, referring to FIGS. 14A through 14C, when the reflecting member 1110 is moved in relation to the second axis A2, the magnets 1171*a* and 1173*a* and the coils 1171*b* and 1173*b* aligned in the first axis A1 direction perpendicular to the second axis A2 move toward or away from each other, respectively. That is, the reflecting member 1110 is moved so that an interval between the magnet 1173*a* and the coil 1173*b* disposed at an upper portion in relation to the second axis A2 is greater or smaller than that between the magnet 1171*a* and the coil 1171*b* disposed at a lower portion in relation to the second axis A2. In this example, the second moving frame 1195 is rotated together with the first moving frame 1193, such that the second moving frame 1195 and the first moving frame 1193 are not moved relative to each other, but are rotated relative to the fixed frame 1191.

Figure 15:
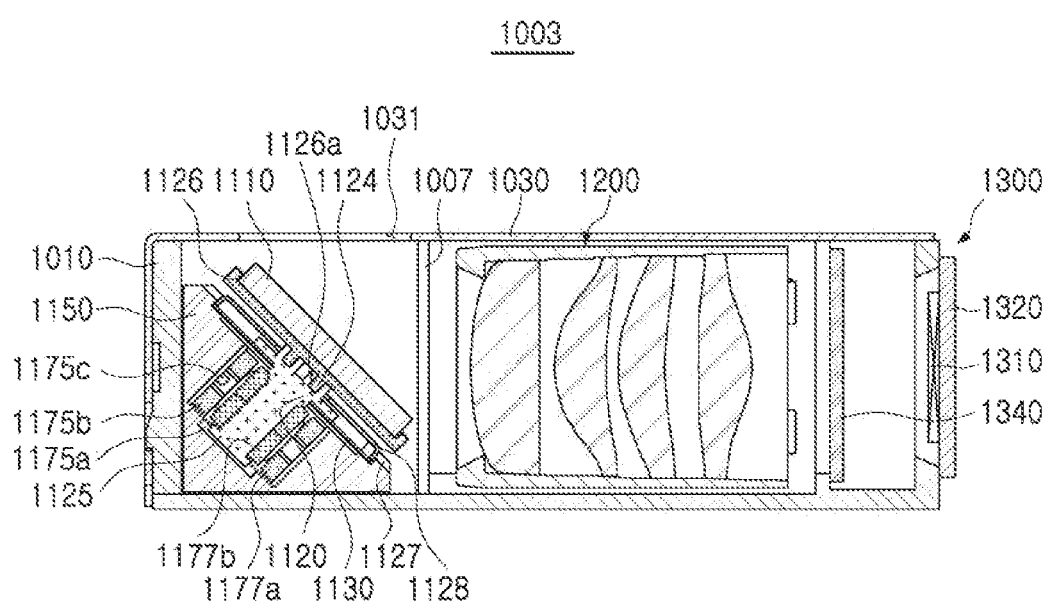
FIG. 15 is a cross-sectional view of a camera module according to an embodiment.
Figure 16:
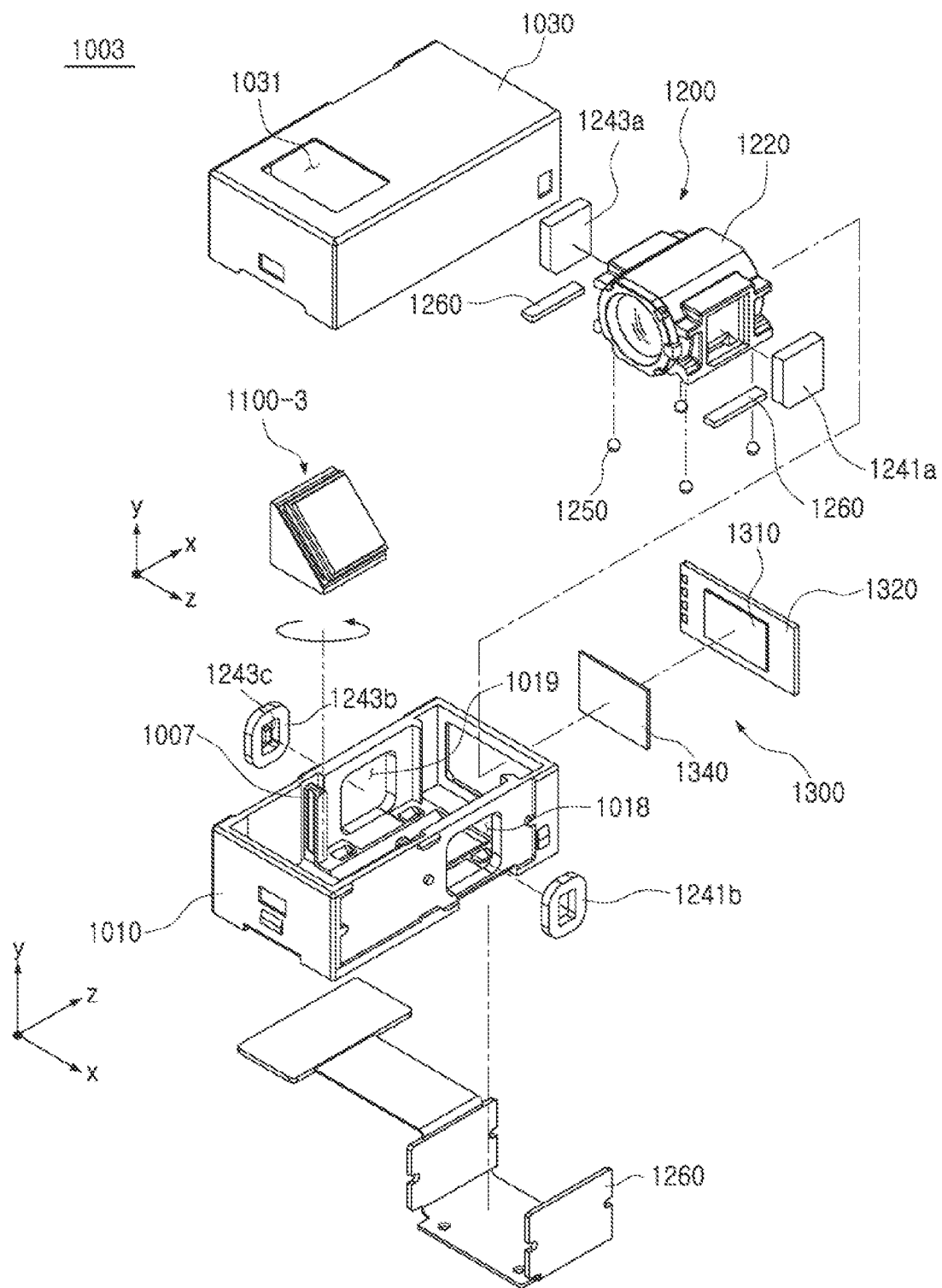
FIG. 16 is an exploded perspective view of the camera module according to an embodiment.
Figure 17:
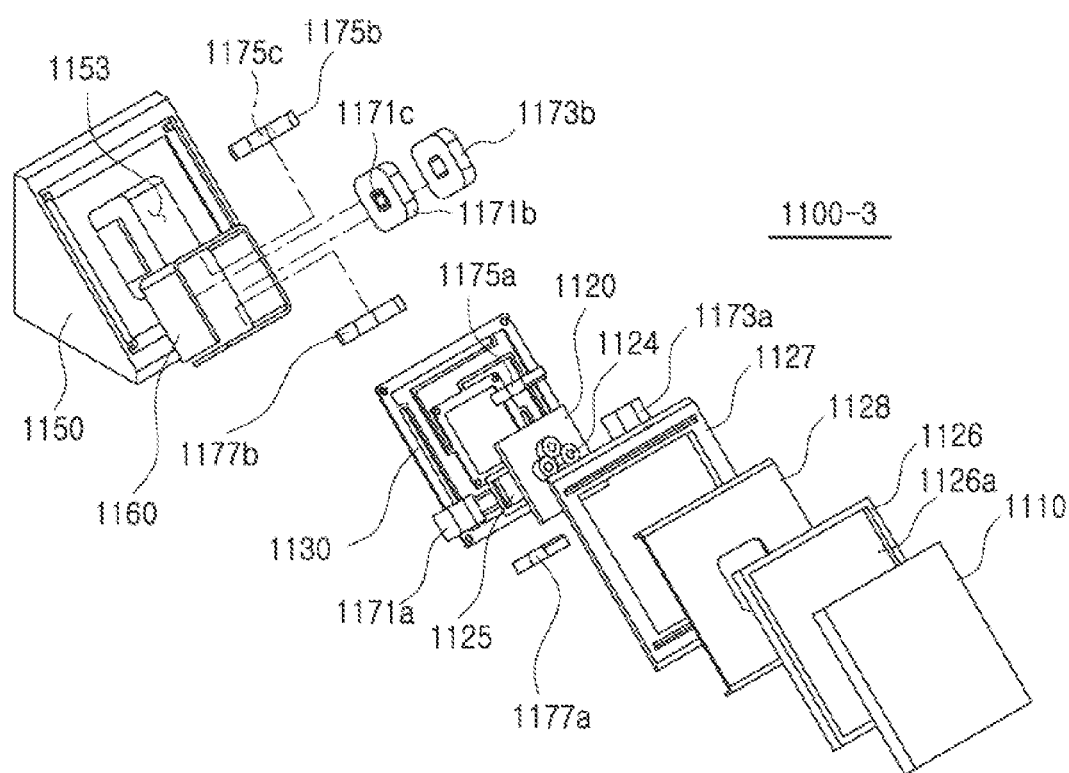
FIG. 17 is an exploded perspective view of a reflecting module of the camera module according to an embodiment.
Figure 18:
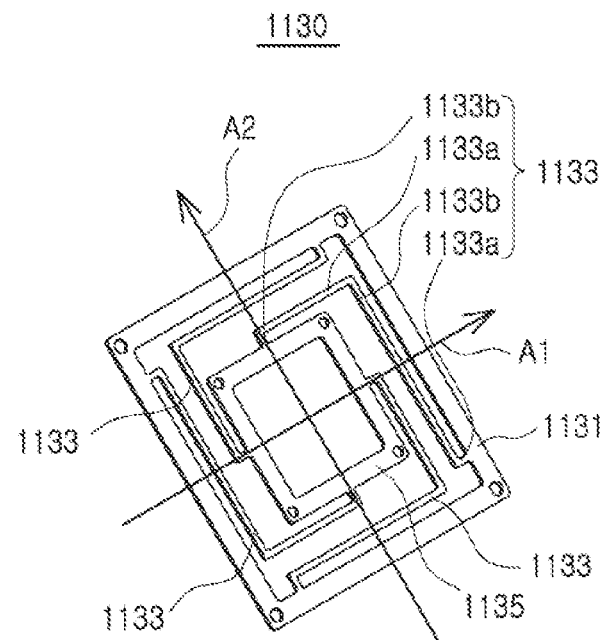
FIG. 18 is a perspective view of an elastic member of the camera module according to an embodiment.

FIG. 15 is a cross-sectional view of a camera module according to an embodiment, FIG. 16 is an exploded perspective view of a camera module according to an embodiment, FIG. 17 is an exploded perspective view of a reflecting module of the camera module according to an embodiment, and FIG. 18 is a perspective view of an elastic member of the camera module according to an embodiment.

Referring to FIGS. 2, and 15 through 18, all the components of a camera module 1003 according to an embodiment except for a reflecting module are the same as those of the camera module 1001 according to previous embodiments. Hereinafter, a configuration of the reflecting module will be described in detail below, and the same components will be denoted by the same reference numerals, and a detailed description thereof will be omitted.

The camera module 1003 according to an embodiment includes a reflecting module 1100-3, the lens module 1200, and the image sensor module 1300 provided in the case 1010.

The reflecting module 1100-3 according to an embodiment may be different from the reflecting module 1100 according to previous embodiments due to including a post 1125 corresponding to a component of the moving holder 1120 of previous embodiments and protruding from an approximately central portion of a lower surface of the moving holder 1120 in a downward direction and a housing 1150 is provided with an insertion hole 1153 into which the post 1125 is inserted. In addition, according to such a structure, the first driving part 1170 is provided on an outer surface of the post 1125 and an inner surface of the insertion hole 1153.

In the reflecting module 1100-3 according to an embodiment, the moving holder 1120 includes the post 1125, such that the center of gravity of the moving holder 1120 including the post 1125 is lowered in the downward direction. Therefore, the center of rotation of the moving holder 1120 is also lowered in the downward direction, such that rotation precision of the reflecting member 1110 mounted on the moving holder 1120 is further improved.

The reflecting module 1100-3 includes the reflecting member 1110, the moving holder 1120 having the reflecting member 1110 mounted thereon and including the post 1125 protruding in the downward direction, an elastic member 1130 supporting the moving holder 1120 so that the moving holder 1120 is moved, the housing 1150 including the insertion hole 1153 into which the post 1125 is inserted and having the elastic member 1130 fixedly coupled thereto so that the moving holder 1120 is provided thereon, the board 1160 coupled to the insertion hole 1153 of the housing 1150, and the first driving part 1170 including the coils 1171b, 1173b, 1175b, and 1177b and hall sensors 1171c and 1175c provided on the board 1160 and magnets 1171a, 1173a, 1175a, and 1177a provided on the outer surface of the post 1125 of the moving holder 1120. Meanwhile, the moving holder 1120 further includes a mirror fixing member 1126 disposed on an upper surface thereof so that the reflecting member 1110 is mounted, and cover members 1127 and 1128 covering members such as the elastic member 1130 may be further included on an upper surface of the housing 1150. Therefore, excessive movement of the moving holder 1120 in an outward direction is prevented.

The reflecting member 1110 changes a direction of light. For example, the reflecting member 1110 may be a mirror or a prism reflecting the light (a case in which the reflecting member 1110 is a mirror is illustrated in the drawings associated with an embodiment for convenience of explanation).

The reflecting member 1110 is fixed to the moving holder 1120. The moving holder 1120 may have a mounting surface (not illustrated) on which the reflecting member 1110 is mounted. Meanwhile, the moving holder 1120 further includes the mirror fixing member 1126 disposed on the upper surface thereof in order to mount the reflecting member 1110, and fixing holes 1124 are provided in the upper surface of the moving holder 1120 and fixing protrusions 1126a are provided in a lower surface of the mirror fixing member 1126, such that the moving holder 1120 and the mirror fixing member 1126 may be coupled to each other in a fitting manner, for example, they can be coupled to each other through bonding by an adhesive (the moving holder 1120 and the mirror fixing member 1126 may be fixed to each other by various other coupling methods between members known in the art). In addition, an inclined mounting surface 1126a is provided on an upper surface of the mirror fixing member 1126, and the reflecting member 1110 is fixedly mounted on the mounting surface 1126a.

The upper surface of the moving holder 1120 may be an inclined surface so that a path of the light is changed. Therefore, the mirror fixing member 1126 coupled to the upper surface of the moving holder 1120 is also mounted on the moving holder in an inclined state. Therefore, the mounting surface 1126a is an inclined surface inclined with respect to, for example, the optical axis (the Z axis) of each of the plurality of lenses at approximately 45°. In addition, the inclined surface of the mounting surface 1126a is directed toward the opening 1031 of the cover 1030 through which the light is incident.

The moving holder 1120 on which the reflecting member 1110 is mounted is movably accommodated in an internal space of the housing 1150. In other words, the moving holder 1120 is moved by an action of the first driving part 1170 so that a relative interval between the moving holder 1120 and the housing 1150 is changed, depending on each position of the moving holder 1120.

The moving holder 1120 is movably fixed to the elastic member 1130. The elastic member 1130 is also fixed to the housing 1150, and the moving holder 1120 is moved relative to the housing 1150 by driving of the first driving part 1170. Therefore, the OIS is performed.

The elastic member 1130 includes a fixed frame 1131 fixed to the housing 1150, a moving frame 1135 provided in the fixed frame 1131 and fixed to the moving holder 1120, and a moving spring 1133 connecting the fixed frame 1131 and the moving frame 1135 to each other and rotatable around two axes (first and second axes). In addition, the fixed frame 1131, the moving spring 1133, and the moving frame 1135 are provided integral with one another. In addition, the fixed frame 1131 and the moving frame 1135 have different sizes, but may have the same shape such as a polygonal shape or a round ring shape.

Here, since the moving holder 1120 is fixed to the housing 1150 by only the elastic member 1130, when the moving holder 1120 is moved in relation to the two axes (the first and second axes) by the first driving part 1170, the moving holder 1120 is not rotated around a rotation axis that is accurately fixed, and may be moved to be entirely biased in a direction in which force is applied to the moving holder 1120 by the first driving part 1170 (a direction in which the moving holder 1120 is pulled or pushed). Therefore, in order to correct for difficulty in driving control of the moving holder 1120, the post 1125 protruding in the downward direction is provided at a lower portion of the moving holder 1120 to lower the center of gravity (the center of rotation) of the moving holder 1120. Therefore, the moving holder 1120 performs a rotary motion close to a circle around a rotation axis.

The moving spring 1133 has a structure in which a first spring 1133a extended in the first axis A1 direction and a second spring 1133b extended in the second axis A2 direction perpendicular to the first axis A1 direction are provided integral with each other (here, the first axis A1 and the second axis A2, axes provided along the inclined mounting surface 1126a of the moving holder 1120, are axes perpendicular to each other). In addition, the first spring 1133a includes one or more springs extended in the first axis A1 direction, and the second spring 1133b includes one or more springs extended in the second axis A2 direction. In addition, a connection portion between the first spring 1133a and the second spring 1133b has a bent or angular shape (see a description for previous embodiments and FIGS. 5 and 6, drawings related to an embodiment with respect to an example in which the connection portion between the first spring 1133a and the second spring 1133b has a round shape). Since the moving spring 1133 is integrally provided and includes the spring provided along the first axis and the spring provided along the second axis, the moving spring 1133 freely rotates around the first axis and the second axis.

The first driving part 1170 generates driving force so that the moving holder 1120 is rotatable around the two axes (the first axis A1 and the second axis A2). Therefore, the moving holder 1120 is moved so that an interval between the moving holder 1120 and a bottom surface of the housing 1150 in each portion is changed.

As an example, the first driving part 1170 includes the magnets 1171a, 1173a, 1175a, and 1177a and the coils 1171b, 1173b, 1175b, and 1177b disposed to face the magnets 1171a, 1173a, 1175a, and 1177a.

When power is applied to the coils 1171b, 1173b, 1175b, and 1177b, the moving holder 1120 on which the magnets 1171a, 1173a, 1175a, and 1177a are mounted rotates around the first axis and the second axis by electromagnetic interaction between the magnets 1171a, 1173a, 1175a, and 1177a and the coils 1171b, 1173b, 1175b, and 1177b.

The magnets 1171a, 1173a, 1175a, and 1177a are mounted on the moving holder 1120. As an example, the magnets 1171a, 1173a, 1175a, and 1177a are mounted on the outer surface of the post 1125 of the moving holder 1120.

The coils 1171b, 1173b, 1175b, and 1177b are mounted on the housing 1150. As an example, the coils 1171b, 1173b, 1175b, and 1177b are mounted in the insertion hole 1153 of the housing 1150 through the board 1160. That is, the coils 1171b, 1173b, 1175b, and 1177b are provided on the board 1160, and the board 1160 is mounted in the insertion hole 1153.

In an embodiment, when the moving holder 1120 is rotated, a closed loop control manner of sensing and feeding back a position of the moving holder 1120 is used.

Therefore, position sensors 1171c and 1175c may be required in order to perform a closed loop control. The position sensors 1171c and 1175c may be hall sensors.

The position sensors 1171c and 1175c are disposed inside or outside the coils 1171b and 1175b, respectively, and may be mounted on the board 1160 on which the coils 1171b and 1175b are mounted.

Meanwhile, the board 1160 may be provided with a gyro sensor (not illustrated) sensing shaking factor such as handshake, or the like, of the user, and may be provided with a driver integrated circuit (IC) (not illustrated) providing driving signals to the coils 1171b, 1173b, 1175b, and 1177b.

Figure 19A:
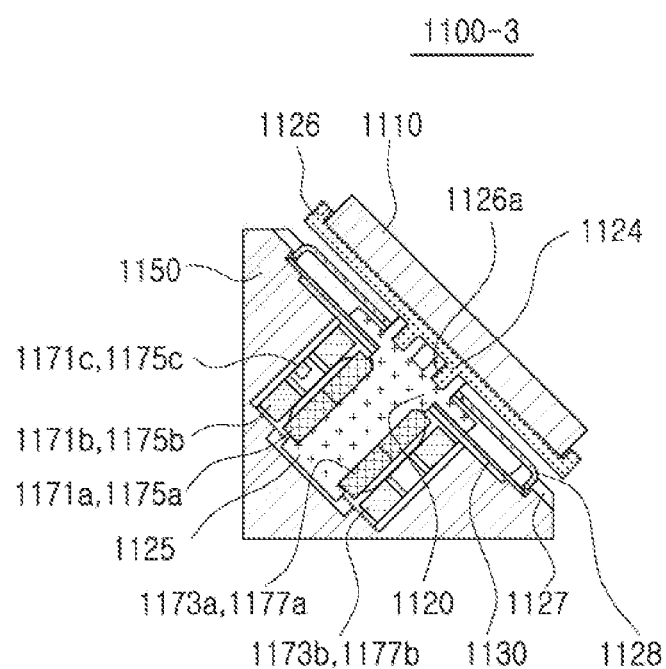
FIGS. 19A through 19C are schematic views of an example in which a moving holder according to an embodiment is moved in relation to a first axis or a second axis.
Figure 19B:
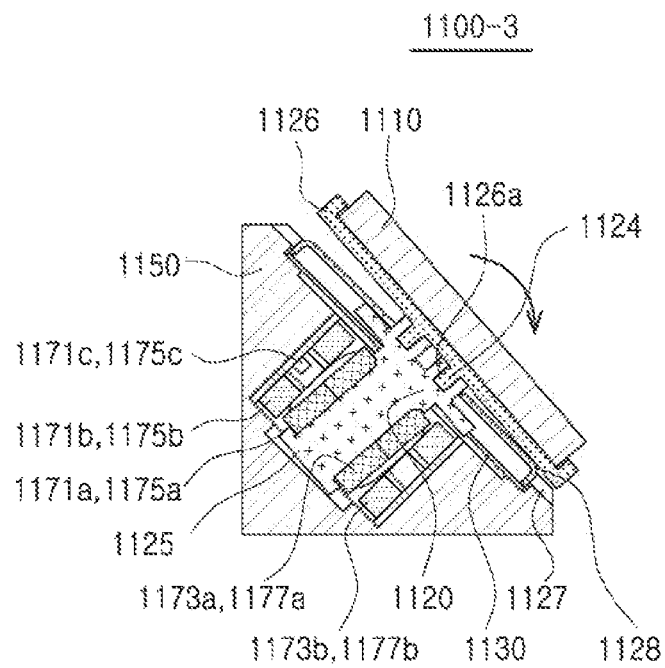
Figure 19C:
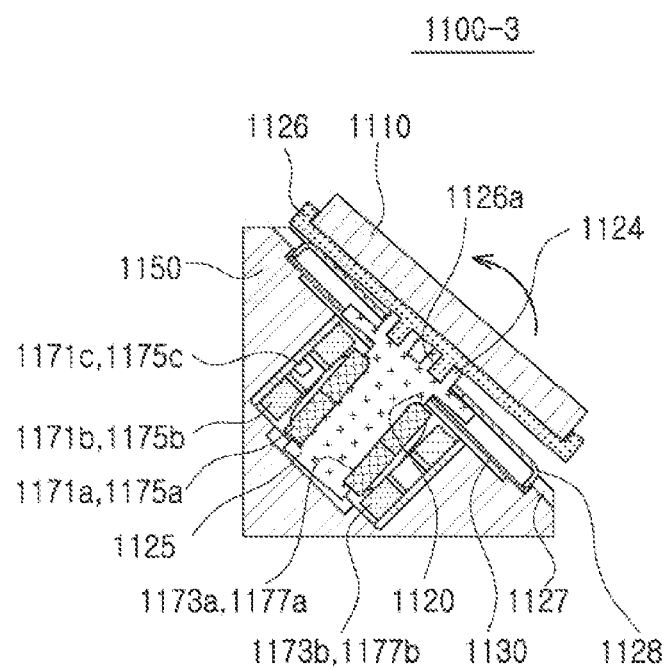

FIGS. 19A through 19C are schematic views of an example in which a moving holder according to an embodiment is moved in relation to a first axis or a second axis.

Referring to FIGS. 19A through 19C, when the moving holder 1120 is moved in relation to the first axis A1, the magnets 1175a and 1177a and the coils 1175b and 1177b aligned in the second axis A2 direction perpendicular to the first axis A1 move toward or away from each other, respectively. That is, the moving holder 1120 is moved so that an interval between the magnet 1175a and the coil 1175b disposed at an upper portion in relation to the first axis A1 is greater or smaller than that between the magnet 1177a and the coil 1177b disposed at a lower portion in relation to the first axis A1.

In addition, when the moving holder 1120 is moved in relation to the second axis A2, the magnets 1171a and 1173a and the coils 1171b and 1173b aligned in the first axis A1 direction perpendicular to the second axis A2 move toward or away from each other, respectively. That is, the moving holder 1120 is moved so that an interval between the magnet 1171a and the coil 1171b disposed on one side in relation to the second axis A2 is greater or smaller than that between the magnet 1173a and the coil 1173b disposed on the other side in relation to the second axis A2.

Figure 20:
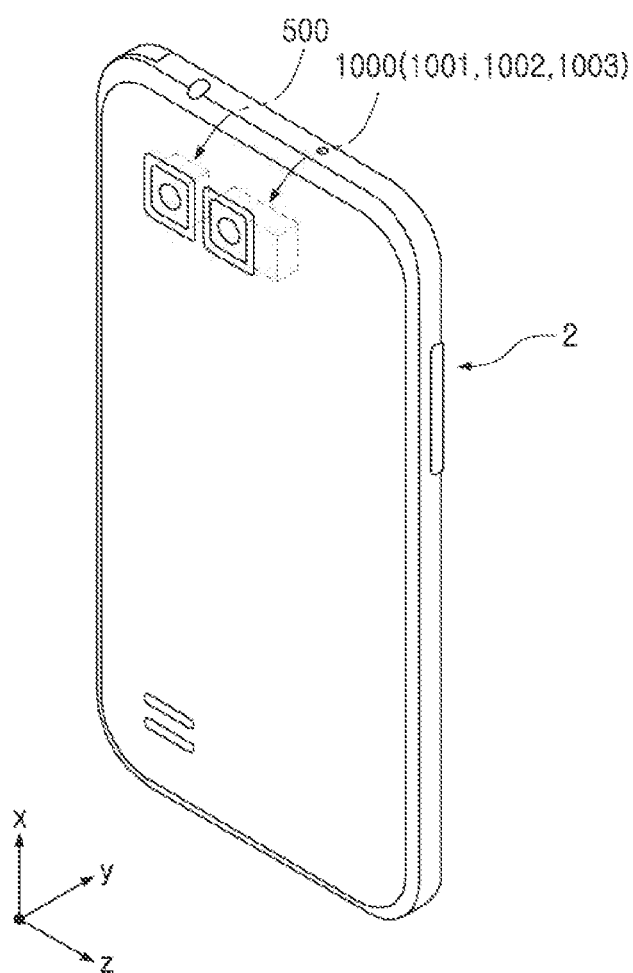
FIG. 20 is a perspective view of a portable electronic device according to an embodiment.

FIG. 20 is a perspective view of a portable electronic device according to an embodiment.

Referring to FIG. 20, a portable electronic device 2 according to an embodiment may be a portable electronic device such as a mobile communications terminal, a smartphone, a tablet personal computer (PC), or the like, in which camera modules 500 and 1000 are mounted.

At least one of the camera modules 500 and 1000 is the camera module 1000: 1001, 1002, or 1003 according to embodiments described with reference to FIGS. 2 through 19C.

That is, a portable electronic device including a dual camera module includes the camera module 1000: 1001, 1002, or 1003 according to embodiments as one or both of two camera modules.

As set forth above, the reflecting module for OIS and the camera module including the same according to embodiments have a simple structure and a reduced size while implementing the autofocusing function, the zoom function, and the OIS function. In addition, power consumption is significantly reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reflecting module for optical image stabilization (OIS), comprising:
   a housing to which a board is coupled, the housing including an opening;
   a moving holder disposed in an internal space of the housing and rotatable around a first axis and a second axis perpendicular to the first axis;
   an elastic member fixedly coupled to the housing to support the moving holder so that the moving holder is movable;
   a reflecting member provided on the moving holder; and
   a driving part including a plurality of magnets provided on the moving holder, and a plurality of coils provided on the board and respectively opposing the plurality of magnets,
   wherein the plurality of coils are disposed to oppose the plurality of magnets through the opening,
   wherein the elastic member includes a housing fixing part fixed to the housing, a holder fixing part fixed to the moving holder, and
   a plurality of first springs extending in a first direction and a plurality of second springs extending in a second direction, wherein the first direction and the second direction intersect each other, and wherein the plurality of first springs and the plurality of second springs are displaced between the housing fixing part and the holder fixing part facing each other in one direction which is parallel with the first axis or the second axis.

2. The reflecting module of claim 1, wherein the board is coupled to an external surface of the housing to expose the plurality of coils to an interior of the housing through the opening.

3. The reflecting module of claim 1, further comprising a position sensor provided on the board to oppose the plurality of magnets to sense a position of the moving holder.

4. The reflecting module of claim 3, wherein the position sensor is a hall sensor.

5. The reflecting module of claim 1, wherein the reflecting member is a prism.

6. The reflecting module of claim 1, wherein the first direction is perpendicular to the second direction.

7. The reflecting module of claim 6, wherein the elastic member is disposed to extend to both lateral surfaces of the moving holder.

8. The reflecting module of claim 6, wherein a moving spring in the elastic member is disposed parallel to a reflection surface of the reflecting member.

9. The reflecting module of claim 1, further comprising a reinforcing plate attached to the board.

10. The reflecting module of claim 1, wherein the moving holder is coupled to the housing only by the elastic member.

11. The reflecting module of claim 1, further comprising an opening through which the reflecting member is exposed, and a cover covering the moving holder.

12. The reflecting module of claim 1, wherein a mounting surface in the moving holder on which the reflecting member is mounted is an inclined surface, wherein the elastic member is disposed parallel to the mounting surface.

13. A camera module comprising:
a lens module including a plurality of lenses; and
the reflecting module for optical image stabilization (OIS) of claim 1, disposed in front of the lens module and configured to alter a path of light incident to the reflecting module so that the light is directed toward the lens module.

14. A moving holder included in a camera module to mount a reflecting member which is rotatable around a first axis and a second axis perpendicular to the first axis, comprising:

a plurality of magnets disposed in an internal space of a housing to which a board is coupled, the housing including an opening, and the plurality of magnets being movably supported by an elastic member fixedly coupled to the housing, and disposed to oppose a plurality of coils exposed through the opening, wherein the elastic member includes a housing fixing part fixed to the housing, a holder fixing part fixed to the moving holder, and a plurality of first springs extending in a first direction and a plurality of second springs extending in a second direction, wherein the first direction and the second direction intersect each other, and wherein the plurality of first springs and the plurality of second springs are displaced between the housing fixing part and the holder fixing part facing each other in one direction which is parallel with the first axis or the second axis.

15. The moving holder of claim 14, wherein the moving holder is coupled to the housing only by the elastic member.

16. The moving holder of claim 14, wherein a mounting surface on which the reflecting member is mounted is an inclined surface.

17. A housing for accommodating a moving holder in an internal space, wherein the moving holder is rotatable around a first axis and a second axis perpendicular to the first axis, wherein a board is coupled to a rear surface of the housing, wherein the housing has an opening so that a coil provided on the board is exposed to the internal space, and has an inclined surface, wherein an elastic member supporting the moving holder is coupled to the inclined surface, wherein the elastic member includes a housing fixing part fixed to the housing, a holder fixing part fixed to the moving holder, a plurality of first springs extending in a first direction and a plurality of second springs extending in a second direction, wherein the first direction and the second direction intersect each other, and wherein the plurality of first springs and the plurality of second springs are displaced between the housing fixing part and the holder fixing part facing each other in one direction which is parallel with the first axis or the second axis.

* * * * *